United States Patent
Fremont

(10) Patent No.: US 10,690,277 B2
(45) Date of Patent: Jun. 23, 2020

(54) RADIO FREQUENCY IDENTIFICATION SMART INSPECTION ASSURANCE CAP

(71) Applicant: Jiffy-tite Co., Inc., Lancaster, NY (US)

(72) Inventor: Bradley C. Fremont, Tonawanda, NY (US)

(73) Assignee: Oetiker NY, Inc., Lancaster, NY (US)

( * ) Notice: Subject to any disclaimer, the term of this patent is extended or adjusted under 35 U.S.C. 154(b) by 345 days.

(21) Appl. No.: 15/460,837

(22) Filed: Mar. 16, 2017

(65) Prior Publication Data

US 2018/0266602 A1    Sep. 20, 2018

(51) Int. Cl.
*F16L 35/00* (2006.01)
*F16L 37/098* (2006.01)
*G06K 19/077* (2006.01)
*G06K 19/07* (2006.01)

(52) U.S. Cl.
CPC ........... *F16L 35/00* (2013.01); *F16L 37/0985* (2013.01); *G06K 19/0716* (2013.01); *G06K 19/07758* (2013.01); *F16L 2201/10* (2013.01)

(58) Field of Classification Search
CPC .......... G06K 19/07758; G06K 19/0716; F16L 2201/10
See application file for complete search history.

(56) References Cited

U.S. PATENT DOCUMENTS

| | | | |
|---|---|---|---|
| 5,604,681 A * | 2/1997 | Koeninger | B67D 7/348 |
| | | | 700/285 |
| 6,271,753 B1 | 8/2001 | Shukla | |
| 6,649,829 B2 * | 11/2003 | Garber | F16L 37/0841 |
| | | | 137/177 |
| 7,061,382 B2 | 6/2006 | Claessens et al. | |
| 7,298,274 B2 | 11/2007 | Chen et al. | |
| 7,400,247 B2 | 7/2008 | Hopman et al. | |
| 7,541,932 B2 | 6/2009 | Lee et al. | |
| 7,696,886 B2 | 4/2010 | Lai | |
| 7,839,288 B2 | 11/2010 | Wang et al. | |
| 8,120,484 B2 | 2/2012 | Chrisholm | |
| 8,297,661 B2 * | 10/2012 | Proulx | F16L 33/22 |
| | | | 285/242 |
| 8,485,359 B2 | 7/2013 | Anderson | |
| 9,107,820 B2 | 8/2015 | Mintchev et al. | |

(Continued)

FOREIGN PATENT DOCUMENTS

GB    2521857 A    7/2015
KR    100927464 B1    11/2009

*Primary Examiner* — David Bochna
(74) *Attorney, Agent, or Firm* — Simpson & Simpson, PLLC; Michael Nicholas Vranjes

(57) ABSTRACT

A radio frequency identification (RFID) smart inspection assurance cap, including a body having a through-bore, an outer surface, and an inner surface and, an RFID circuit including an RFID chip a first circuit lead connected to the RFID chip, and a second circuit lead connected to the RFID chip, the first circuit lead and the second circuit lead electrically disconnected from one another, deactivating the RFID chip wherein the RFID smart inspection assurance cap is operatively arranged on a fluid connector, the first circuit lead is arranged to contact the fluid connector, the second circuit lead is arranged to contact the fluid connector, wherein the RFID circuit is completed when the first circuit lead and the second circuit lead simultaneously contact the fluid connector.

20 Claims, 24 Drawing Sheets

(56) References Cited

U.S. PATENT DOCUMENTS

| | | | |
|---|---|---|---|
| 9,283,334 B2* | 3/2016 | Mantell | A61M 13/00 |
| 2006/0076419 A1* | 4/2006 | Johnson | F16L 33/30 |
| | | | 235/492 |
| 2008/0073906 A1* | 3/2008 | Turner | F16L 39/02 |
| | | | 285/120.1 |
| 2008/0238675 A1 | 10/2008 | Yang | |
| 2009/0137887 A1* | 5/2009 | Shariati | A61B 5/0031 |
| | | | 600/345 |
| 2010/0057296 A1* | 3/2010 | Ryman | F16L 37/08 |
| | | | 701/36 |
| 2010/0286467 A1* | 11/2010 | Pesach | A61M 5/158 |
| | | | 600/9 |
| 2012/0000858 A1 | 1/2012 | Butler et al. | |
| 2015/0032253 A1 | 1/2015 | O'Dougherty et al. | |
| 2015/0061282 A1* | 3/2015 | Faldt | F16L 39/00 |
| | | | 285/124.5 |
| 2015/0238673 A1* | 8/2015 | Gerber | G06K 19/077 |
| | | | 210/85 |
| 2016/0178101 A1* | 6/2016 | Blake | F16L 37/0987 |
| | | | 285/417 |
| 2016/0186906 A1* | 6/2016 | Blake | F16L 37/098 |
| | | | 285/319 |
| 2016/0229680 A1* | 8/2016 | Cornett | F16L 55/1015 |
| 2016/0332452 A1* | 11/2016 | Begeal | B41J 2/17546 |
| 2016/0369922 A1* | 12/2016 | Blake | F16L 37/0987 |
| 2018/0073670 A1* | 3/2018 | Wolfgang | F16L 37/096 |
| 2019/0049049 A1* | 2/2019 | Ignaczak | G06K 19/0716 |

\* cited by examiner

RADIO FREQUENCY IDENTIFICATION SMART INSPECTION ASSURANCE CAP

FIELD

This disclosure relates generally to a fluid connector, and, more specifically, to a fluid connector including a radio frequency identification (RFID) chip arranged on or within an assurance cap to allow position testing of the cap with RFID detection means to reduce possible leak paths of the fluid connector.

BACKGROUND

Fluid connectors are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors.

When fluid connectors are secured to devices such as radiators, tubular connectors inserted into these fluid connectors may not be fully seated and allow leak paths to form once the assembly is pressurized. Current tubular connectors include a witness bead which is used as a visual indicator of proper sealing, but these witness beads are not always reliable as it is dependent on a human user to check.

In addition to a witness bead, an assurance cap may be used to further secure and verify the tubular connector is properly inserted into the fluid connector. The assurance cap is installed concentrically about the tubular connector and snaps over an outer circumference of the fluid connector. In some instances, the assurance cap may only partially secure to the fluid connector since these fluid connectors are typically installed in the confined spaces of an engine bay of an automobile. Moreover, a user may not be able to hear the audible "click" sound when the assurance cap fully secures to the fluid connector, leading to the tubular connector blowing out of the fluid connector since it was not fully installed.

Thus, there has been a long-felt need for an assurance cap which can be secured to a fluid connector which allows a user to positively ensure that the assurance cap is properly seated such that the tubular connector is secured within the fluid connector and that the assurance cap is secured to the fluid connector.

BRIEF SUMMARY

The present disclosure broadly includes a radio frequency identification (RFID) smart inspection assurance cap, including a body having a through-bore, an outer surface, and an inner surface and, an RFID circuit including an RFID chip, a first circuit lead connected to the RFID chip, and a second circuit lead connected to the RFID chip, the first circuit lead and the second circuit lead electrically disconnected from one another, deactivating the RFID chip wherein the RFID smart inspection assurance cap is operatively arranged on a fluid connector, the first circuit lead is arranged to contact the fluid connector, the second circuit lead is arranged to contact the fluid connector, wherein the RFID circuit is completed when the first circuit lead and the second circuit lead simultaneously contact the fluid connector.

Additionally, the present disclosure broadly includes a fluid connector assembly including a fluid connector having a through-bore, a tubular connector arranged in the through-bore of the fluid connector, and an RFID smart inspection assurance cap operatively arranged to connect to the fluid connector, the RFID smart inspection assurance cap including a body having a through-bore, an outer surface, and an inner surface and, an RFID circuit including an RFID chip a first circuit lead connected to the RFID chip, and a second circuit lead connected to the RFID chip, the first circuit lead and the second circuit lead electrically disconnected from one another, deactivating the RFID chip wherein the RFID smart inspection assurance cap is operatively arranged on a fluid connector, the first circuit lead is arranged to contact the fluid connector, the second circuit lead is arranged to contact the fluid connector, wherein the RFID circuit is completed when the first circuit lead and the second circuit lead simultaneously contact the fluid connector.

Even further, the present disclosure broadly includes an RFID smart inspection assurance cap, including a body having a through-bore axially arranged within the body, an outer surface, an inner surface, and an aperture arranged radially within the body, and a sensor ring arranged within the through-bore and in contact with the inner surface, the sensor ring comprising an RFID chip.

These and other objects, features and advantages of the present disclosure will become readily apparent upon a review of the following detailed description, in view of the drawings and appended claims.

BRIEF DESCRIPTION OF THE DRAWINGS

The nature and mode of operation of the present disclosure will now be more fully described in the following detailed description of the disclosure taken with the accompanying figures, in which.

DETAILED DESCRIPTION

At the outset, it should be appreciated that like drawing numbers on different drawing views identify identical, or functionally similar, structural elements of the disclosure. It is to be understood that this disclosure is not limited to the disclosed aspects.

Furthermore, it is understood that this disclosure is not limited to the particular methodology, materials and modifications described and, as such, may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains.

Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 1:
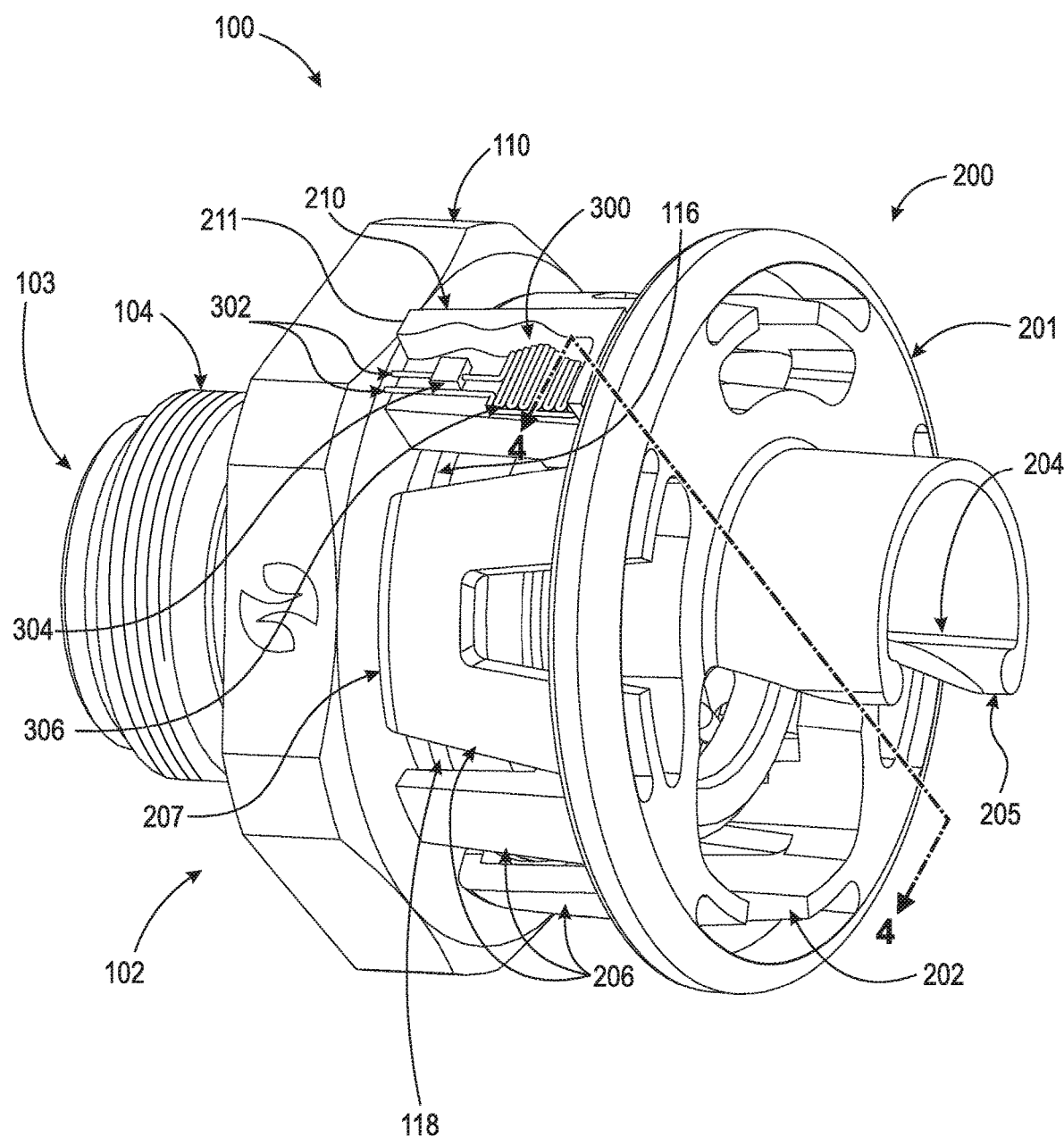
FIG. 1 is a perspective view of a fluid connector and a first example embodiment of an assurance cap assembly.

Adverting now to the figures, FIG. 1 is a perspective view of fluid connector 100 and a first example embodiment of assurance cap assembly 200. Assurance cap assembly 200 secures to fluid connector 100 on section 101 (shown in FIG. 2). Section 102 of fluid connector 100 comprises threads 104 which allow fluid connector 100 to secure to an apparatus such as a transmission, radiator, oil cooler, etc. Fluid connector 100 also includes head 110 which allows a user to use a tool such as a wrench to screw fluid connector 100 into a corresponding apparatus (not shown). Through-bore 103 (shown in FIG. 2) is arranged in the center of fluid connector 100 and passes through the whole body of fluid connector 100.

Figure 2A:
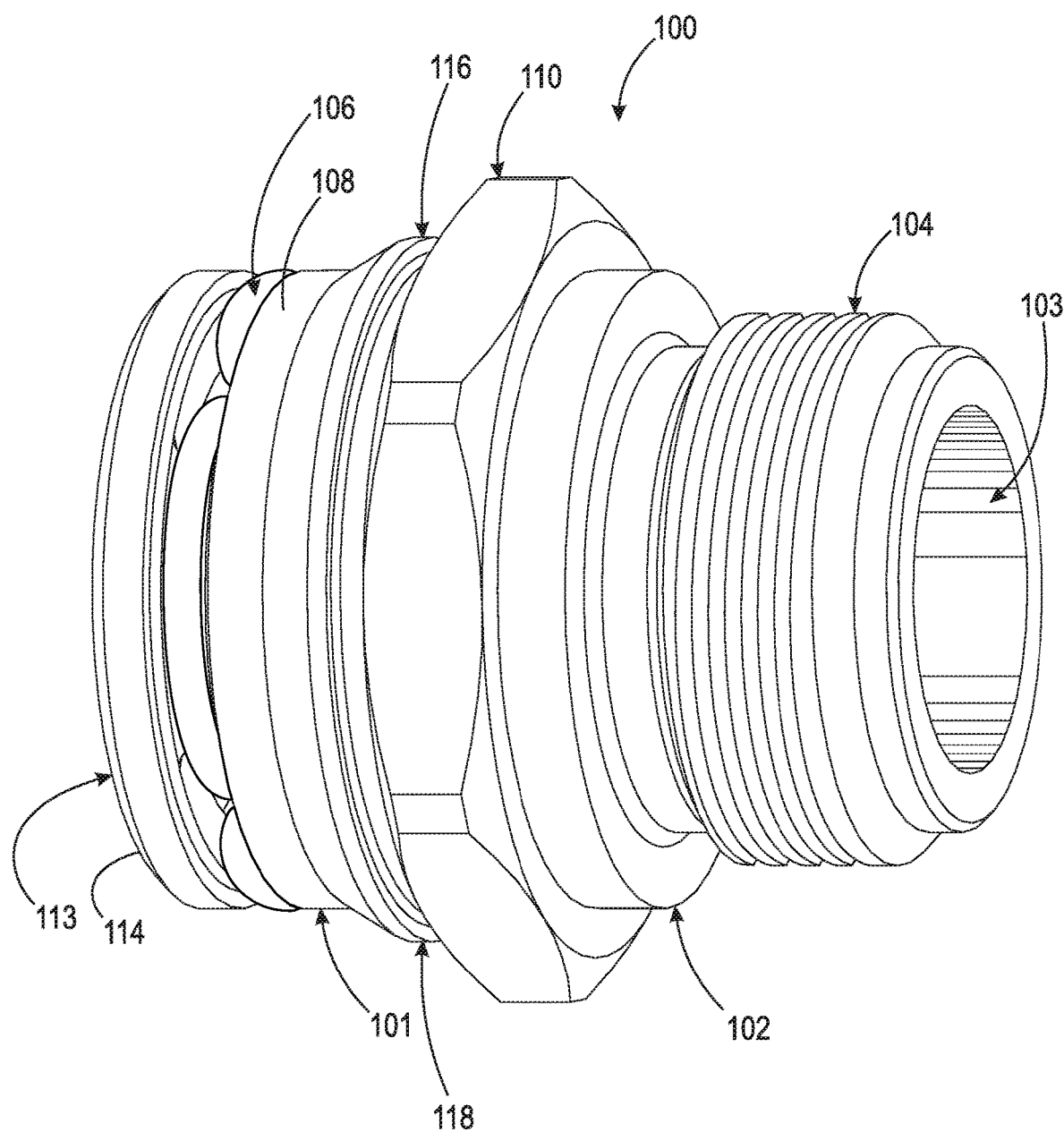
FIG. 2A is a front perspective view of the fluid connector.
Figure 2B:
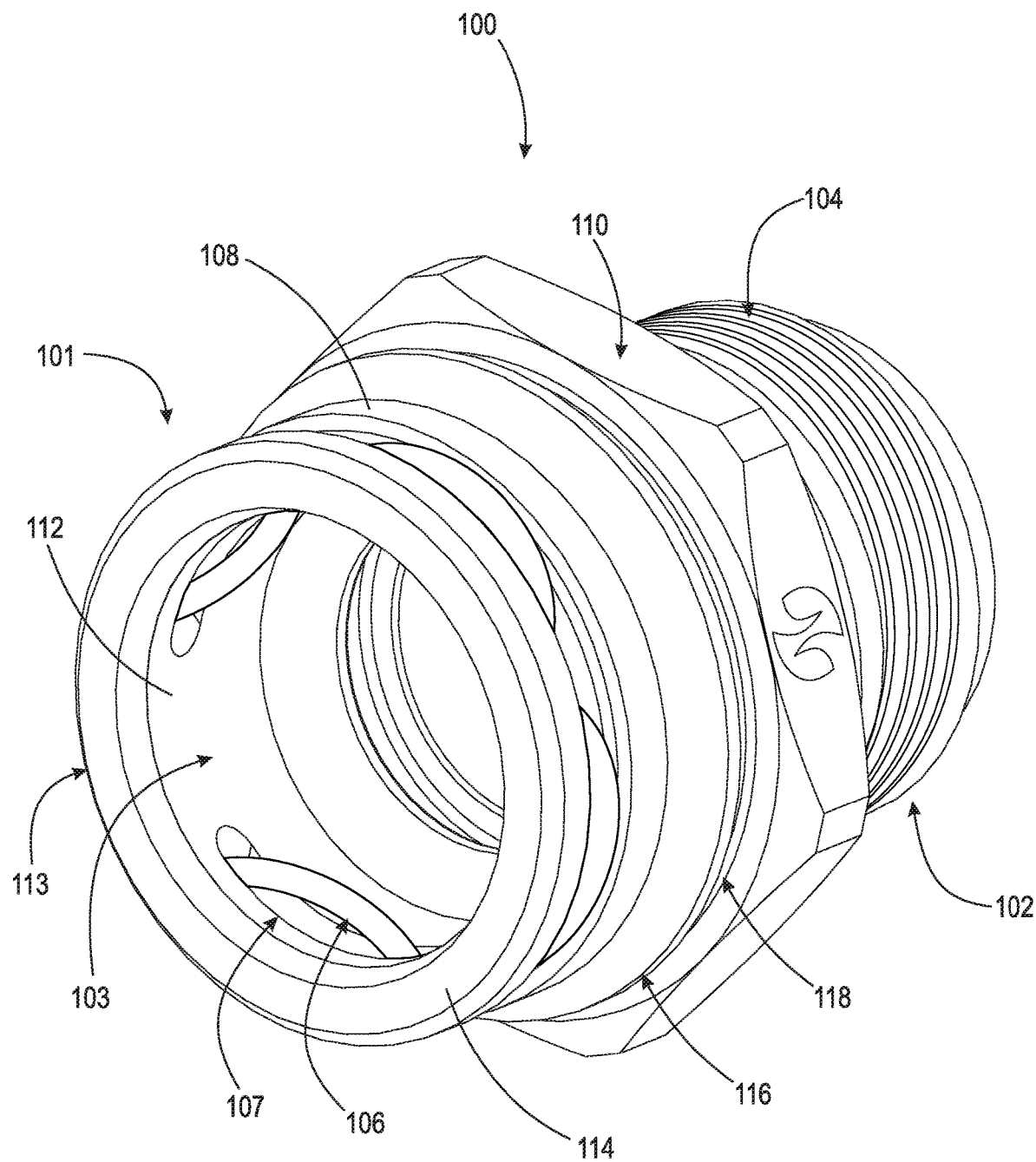
FIG. 2B is a rear perspective view of the fluid connector.

FIG. 2A and FIG. 2B are a front perspective view and a rear perspective view, respectively, of fluid connector 100. Fluid connector 100 comprises section 101 and section 102. Section 101 includes snap ring 106, outer surface 108, inner surface 112, shoulder 113, shoulder surface 114, shoulder 116, and channel 118. Snap ring 106 is arranged within apertures 107 of fluid connector 100 and secures tubular connector 800 (shown in FIG. 4) within through-bore 103 of fluid connector 100.

Figure 3A:
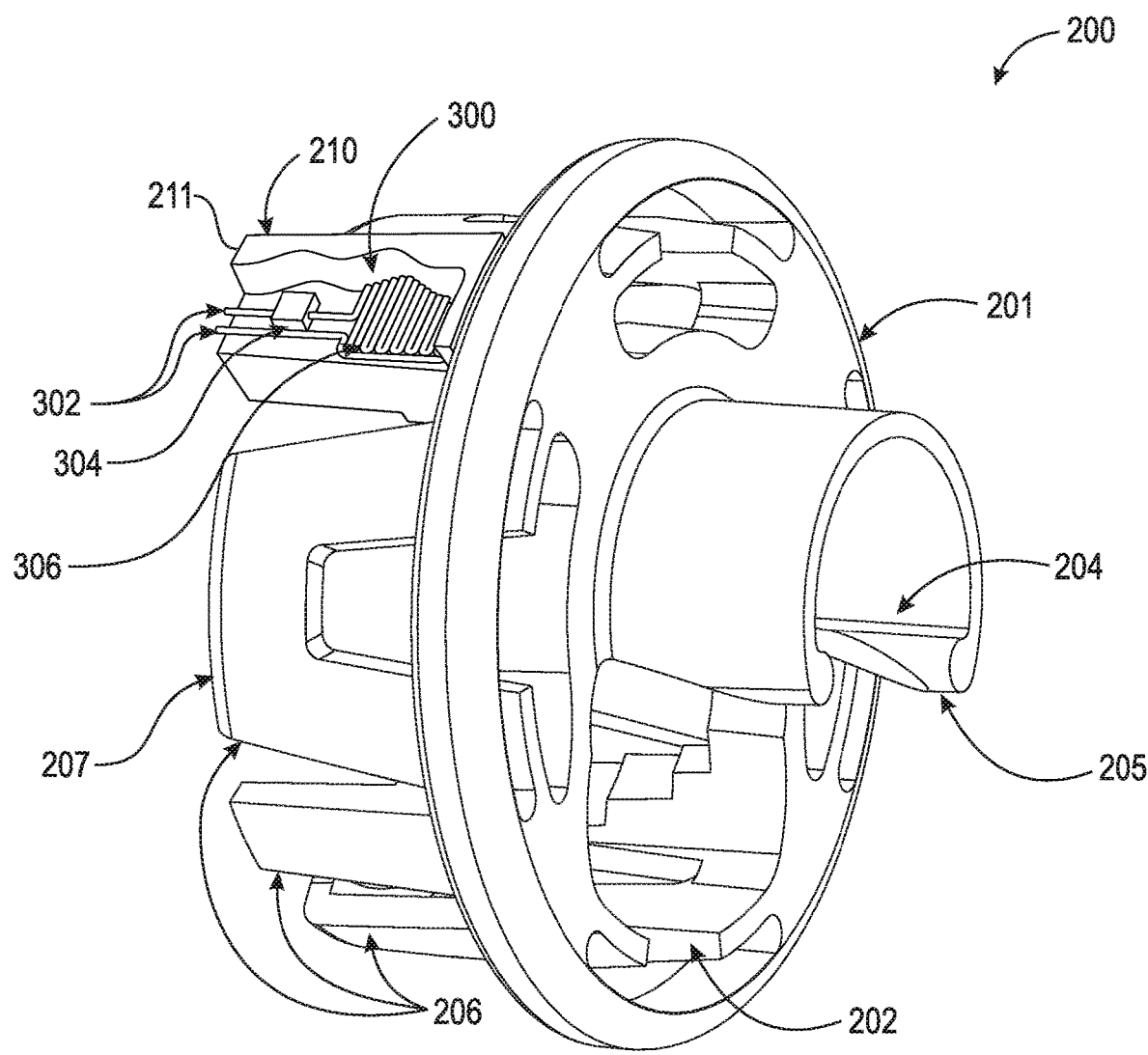
FIG. 3A is a front perspective view of the first example embodiment of the assurance cap assembly.
Figure 3B:
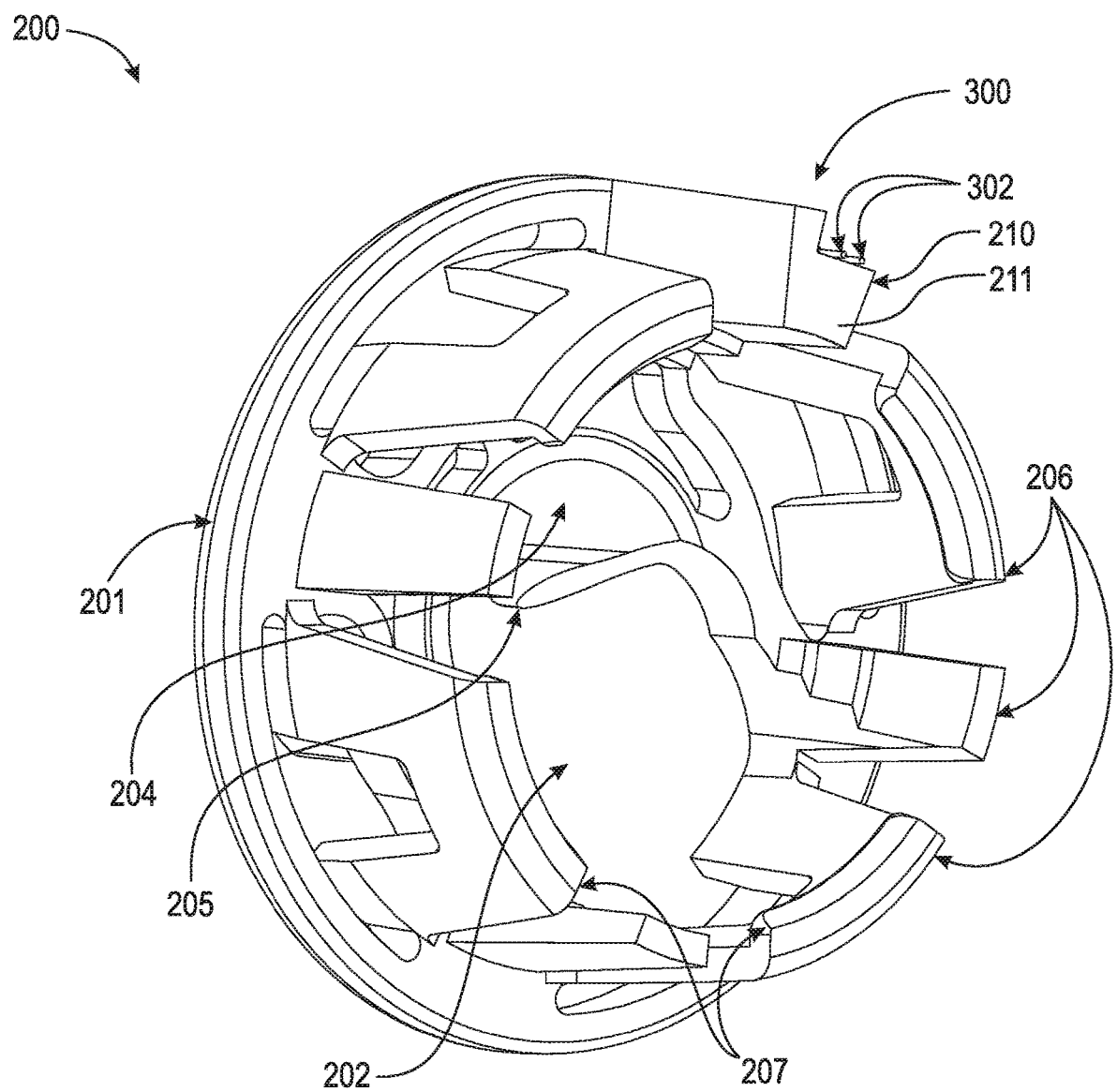
FIG. 3B is a rear perspective view of the first example embodiment of the assurance cap assembly.

FIG. 3A and FIG. 3B are a front perspective view and a rear perspective view, respectively, of the first example embodiment of assurance cap assembly 200. Assurance cap assembly 200 broadly comprises body 201, channel 202, through-bore 204, lips 205, arms 206, tabs 207, sensor arm 210, surface 211, and sensor circuit 300. Channel 202 is arranged to allow tubular connector 800 (shown in FIG. 4) and a hose to be concentrically arranged within body 201. Tubular connector 800 (shown in FIG. 4) is arranged within channel 202 and then pressed into through-bore 204, deforming lips 205. Once tubular connector 800 (shown in FIG. 4) is arranged within through-bore 204, lips 205 return to their original position to further secure tubular connector 800 within through-bore 204. Arms 206 extend axially from body 201 and are operatively arranged to secure assurance cap assembly 200 to fluid connector 100. Tabs 207 are operatively arranged on the distal ends of arms 206. The geometry of arms 206 and tabs 207 allow for tabs 207 to deform around shoulder 116 and secure within channel 118 of fluid connector 100. This interaction between channel 118 and tabs 207 secure assurance cap assembly 200 to fluid connector 100. Sensor arm 210 houses sensor circuit 300, with sensor circuit 300 embedded within sensor arm 210. Sensor arm 210 is show as a cutaway in order to improve clarity of sensor circuit 300. Sensor circuit 300 comprises circuit leads 302, RFID chip 304, and antenna 306. Circuit leads 302 axial extend and protrude from surface 211 of sensor arm 210. Additionally, circuit leads 302 are operatively arranged to not engage one another in such a way which would complete and allow electricity to flow through sensor circuit 300.

Figure 4:
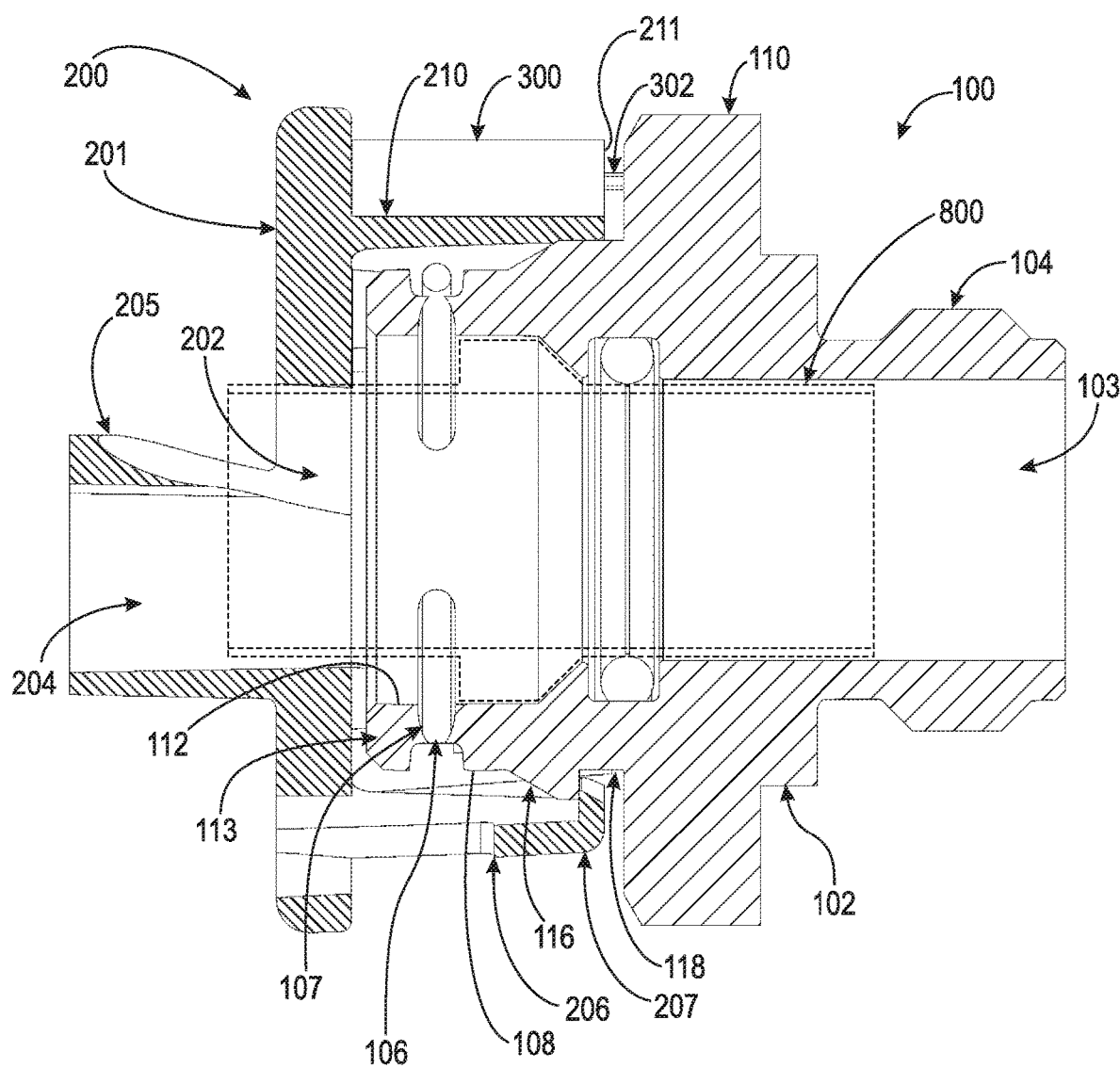
FIG. 4 is a cross-sectional view of the fluid connector and the first example embodiment of the assurance cap assembly taken generally along line 4-4 in FIG. 1.

FIG. 4 is a cross-sectional view of fluid connector 100 and the first example embodiment of assurance cap assembly 200 taken generally along line 4-4 in FIG. 1. As shown in the figure, sensor circuit 300 only activates when circuit leads 302 are in contact with fluid connector 100. In an example embodiment, fluid connector 100 is made of an electrical conducting material such as metal. However, it should be appreciated that fluid connector 100 only requires an electrical conducting section to complete sensor circuit 300. The electrical conducting section only needs to be arranged on fluid connector 100 in such a way as to allow circuit leads 302 to complete sensor circuit 300. An example of an electrical conducting section of fluid connector 100 comprises head 110 made of an electrical conducting material, while the remainder of fluid connector 100 is made of a non-conducting material such as plastic. In order for circuit leads 302 to reach fluid connector 100, tabs 207 must be arranged within channel 118. If tabs 207 are not arranged within channel 118, assurance cap assembly 200 is not properly seated on fluid connector 100. If assurance cap assembly 200 is not properly seated on fluid connector 100, then sensor circuit 300 will not be completed and RFID chip 304 will be unable to be scanned by an RFID reader by a technician during installation of assurance cap assembly 200. This lack of a reading is an indication to the technician that assurance cap assembly 200 is not properly seated on fluid connector 100 and must be reset. The completion of sensor circuit 300 due to the contact of circuit leads 302 with fluid connector 100 is due to the geometry of shoulder 116, channel 118, arms 206, tabs 207, sensor arm 210 and sensor circuit 300. Tubular connector 800 is represented in FIG. 4 as a dashed outline for clarity. It should be understood that tubular connector 800 is a solid body arranged within the assembly. Additionally, it should be understood that tubular connector 800 is arranged in each and every embodiment of an assurance cap assembly contained within this disclosure.

Figure 5:
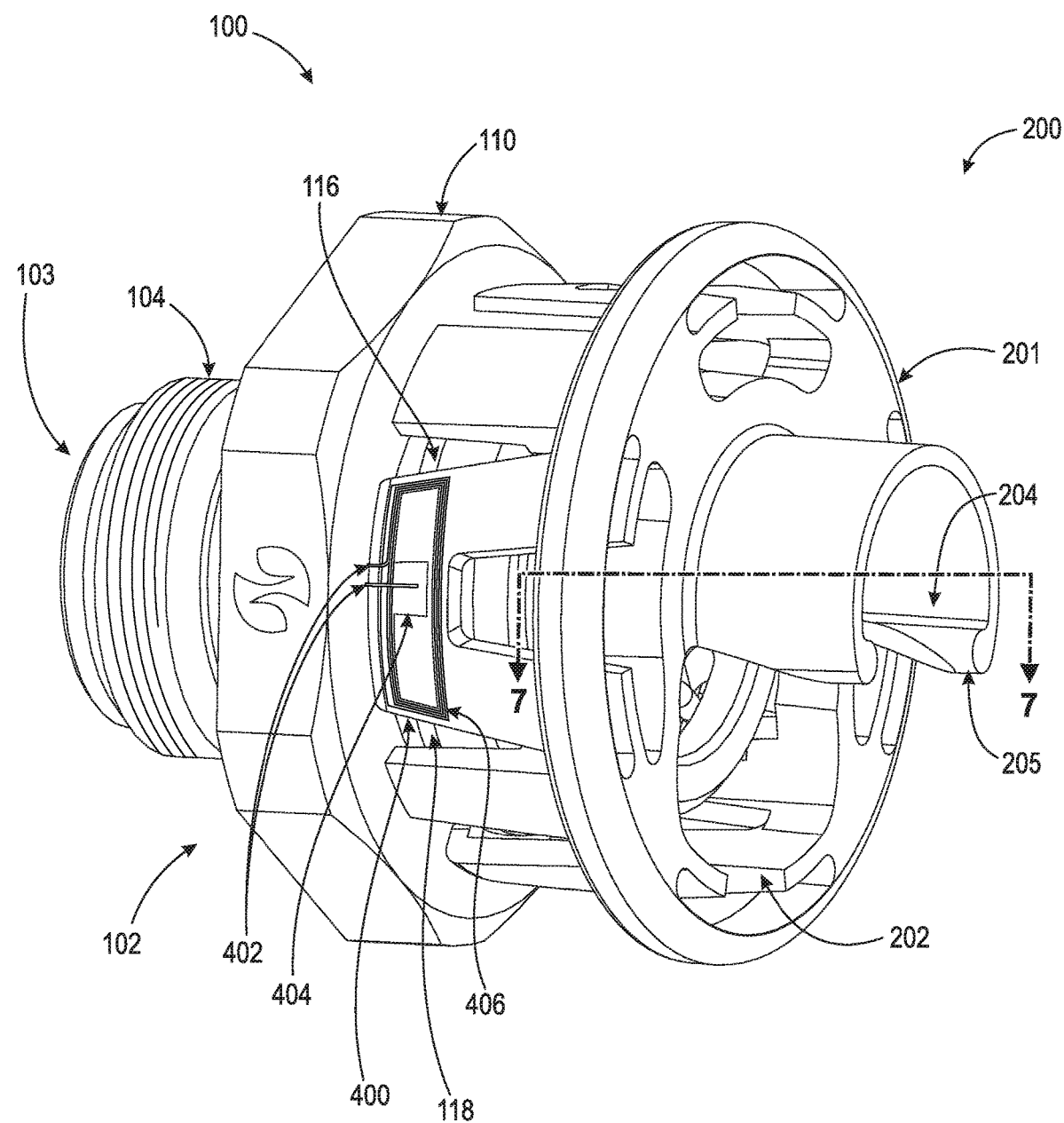
FIG. 5 is a perspective view of a fluid connector and a second example embodiment of an assurance cap assembly.

FIG. 5 is a perspective view of fluid connector 100 and a second example embodiment of assurance cap assembly 200. The second example embodiment of assurance cap assembly 200 is structurally substantially identical to the first example embodiment of assurance cap assembly 200 except for the sensor which is placed on the assurance cap assembly. The second example embodiment of assurance cap assembly 200 includes sensor circuit 400. Sensor circuit 400 comprises circuit leads 402, RFID chip 404, and antenna 406. Circuit leads 402 axially extend and protrude from sensor arm 220. Additionally, circuit leads 402 are operatively arranged to not engage one another in such a way which would complete sensor circuit 400 and allow electricity to flow through sensor circuit 400.

Figure 6A:
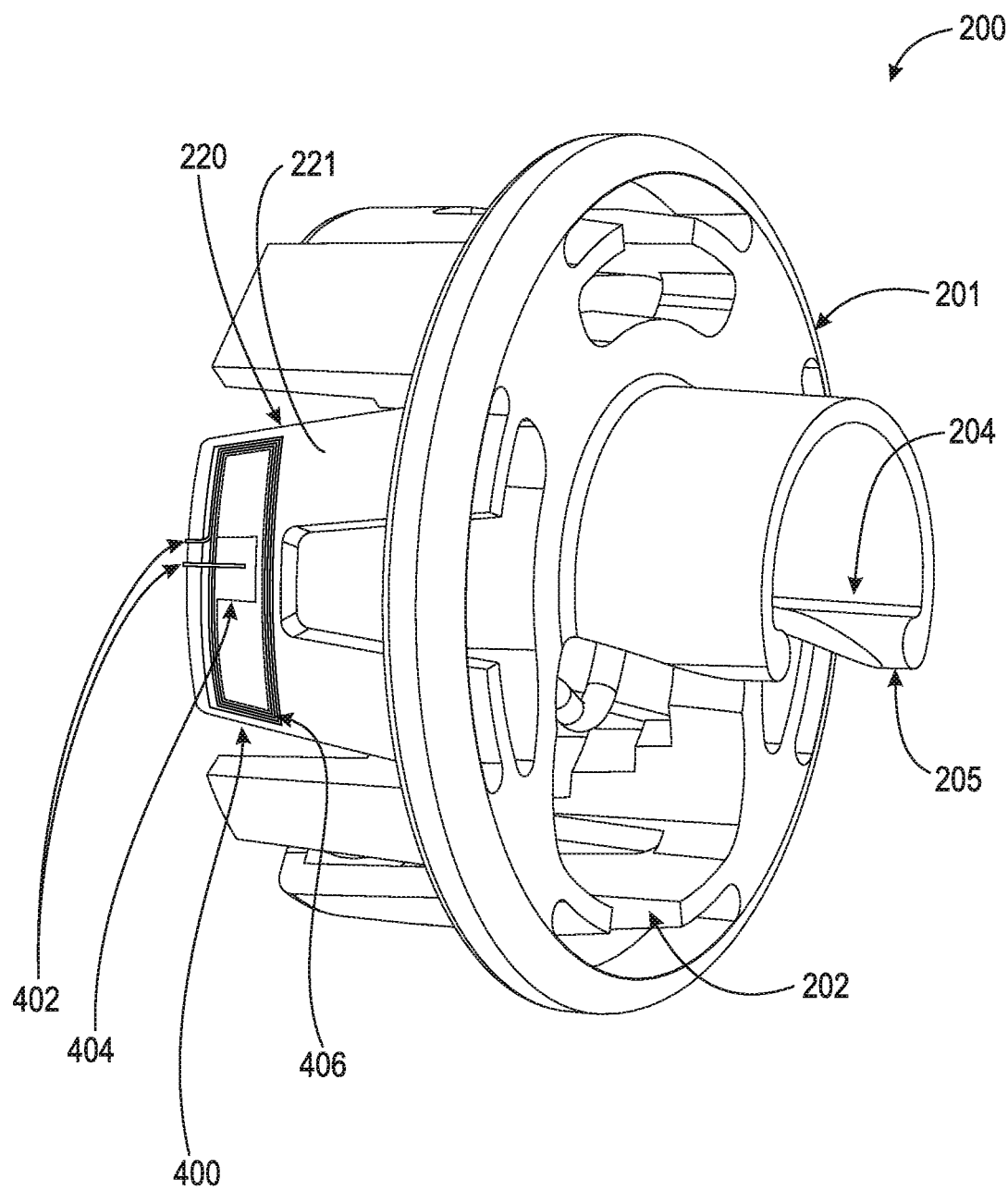
FIG. 6A is a front perspective view of the second example embodiment of the assurance cap assembly.
Figure 6B:
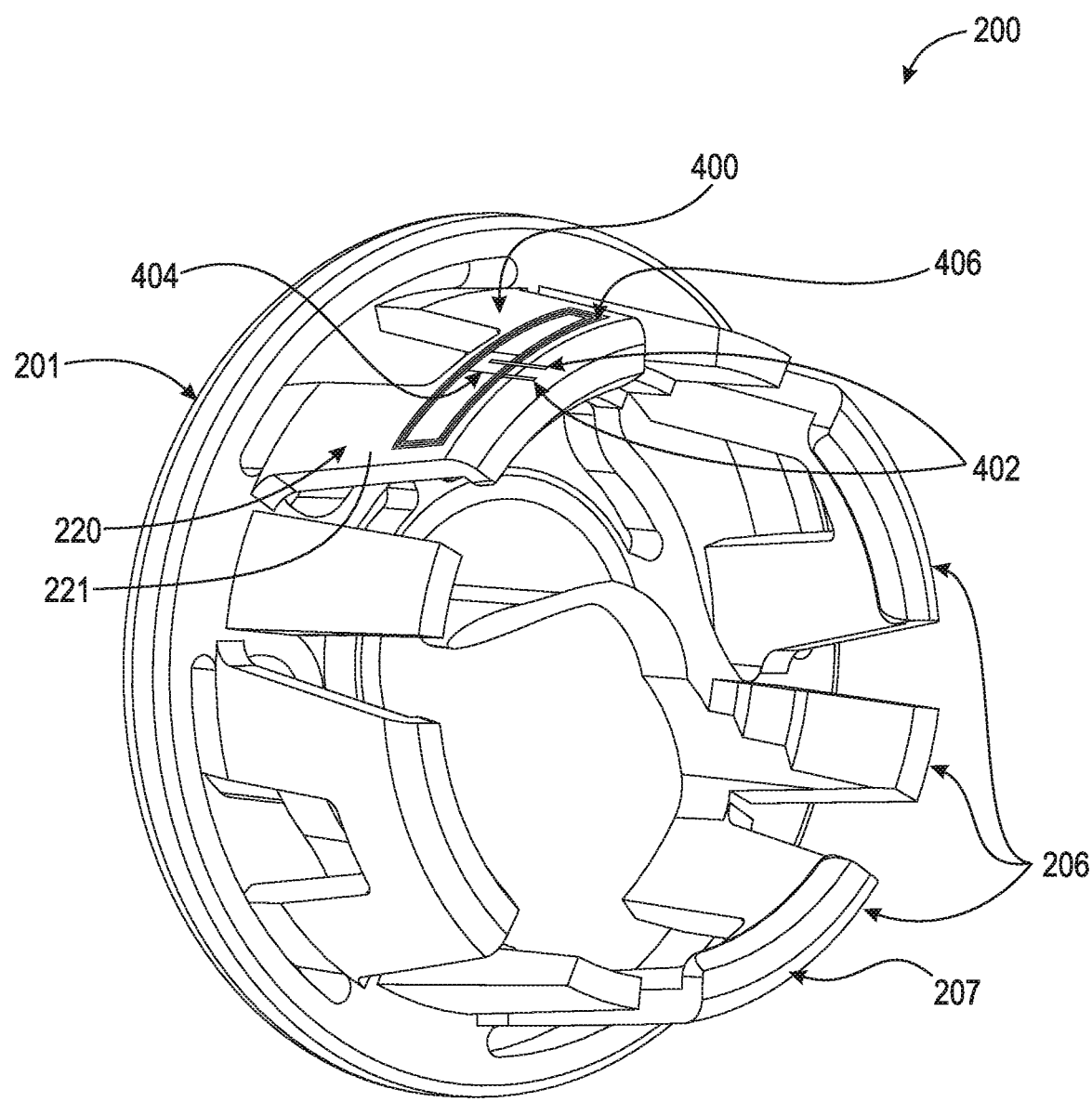
FIG. 6B is a rear perspective view of the second example embodiment of the assurance cap assembly.

FIG. 6A and FIG. 6B are a front perspective view and a rear perspective view, respectively, of the second example embodiment of assurance cap assembly 200. Sensor circuit 400 is operatively arranged on surface 221 of sensor arm 220. In an example embodiment, sensor circuit 400 is arranged on a substrate prior to being placed on sensor arm 220, similar to a sticker or the like. However, it should be appreciated that sensor circuit 400 can be integral with sensor arm 220 or arranged directly on surface 221 of sensor arm 220.

Figure 7:
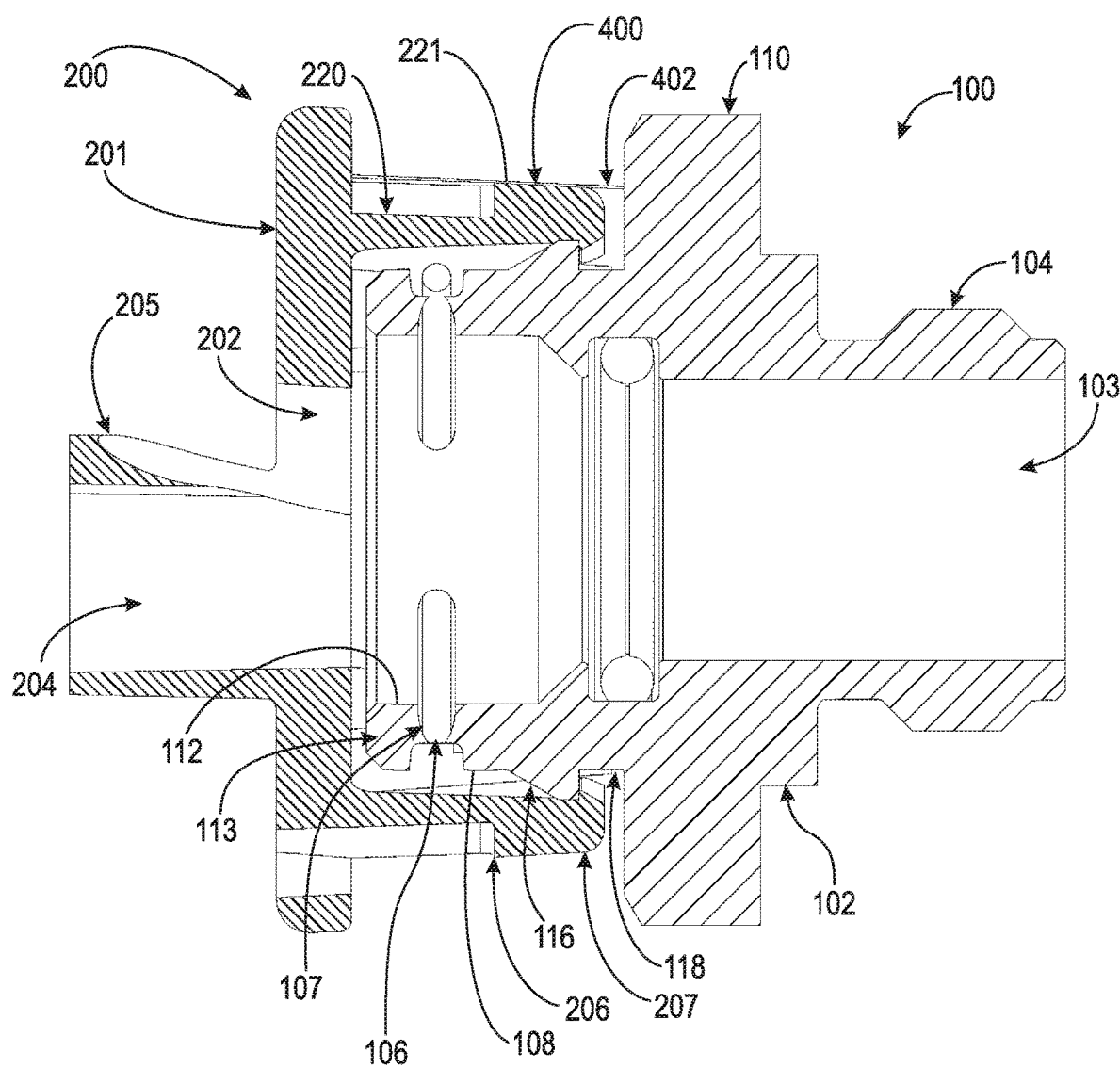
FIG. 7 is a cross-sectional view of the fluid connector and the second example embodiment of the assurance cap assembly taken generally along line 7-7 in FIG. 5.

FIG. 7 is a cross-sectional view of fluid connector 100 and the second example embodiment of assurance cap assembly 200 taken generally along line 7-7 in FIG. 5. As shown in the figure, sensor circuit 400 only activates when circuit leads 402 are in contact with fluid connector 100. In an example embodiment, fluid connector 100 is made of an electrical conducting material such as metal. However, it should be appreciated that fluid connector 100 only requires an electrical conducting section to complete sensor circuit 400. The electrical conducting section only needs to be arranged on fluid connector 100 in such a way as to allow circuit leads 402 to complete sensor circuit 400. An example of an electrical conducting section of fluid connector 100 comprises head 110 made of an electrical conducting material while the remainder of fluid connector 100 is made of a non-conducting material, such as plastic. In order for circuit leads 402 to reach fluid connector 100, tabs 207 must be arranged within channel 118. If tabs 207 are not arranged within channel 118, assurance cap assembly 200 is not properly seated on fluid connector 100. If assurance cap assembly 200 is not properly seated on fluid connector 100, then sensor circuit 400 will not be completed and RFID chip 404 will be unable to be scanned by an RFID reader by a technician during installation of assurance cap assembly 200. This lack of a reading is an indication to the technician that assurance cap assembly 200 is not properly seated on fluid connector 100 and must be reset. The completion of sensor circuit 400 due to the contact of circuit leads 402 with fluid connector 100 is due to the geometry of shoulder 116, channel 118, arms 206, tabs 207, sensor arm 220 and sensor circuit 400.

Figure 8:
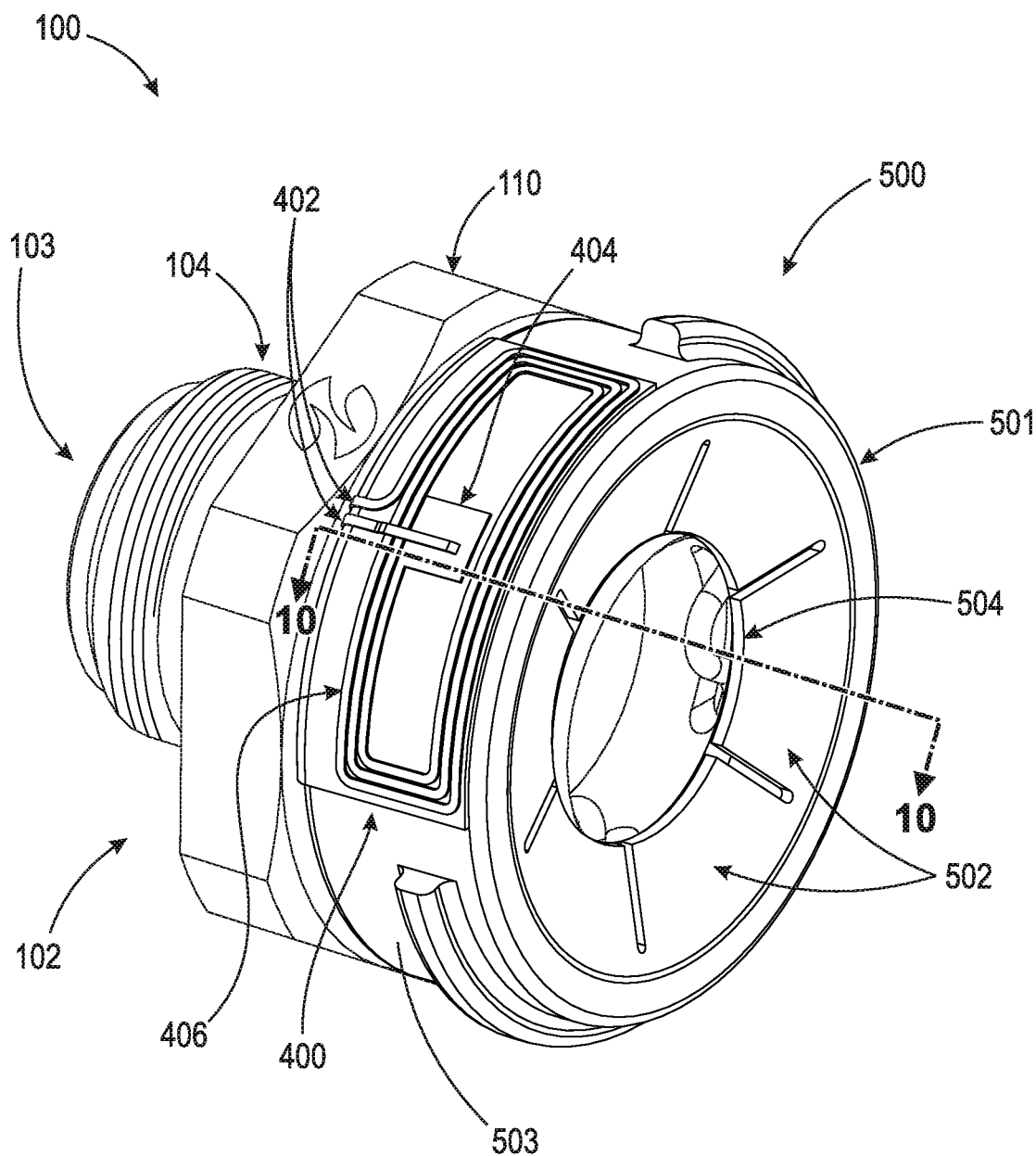
FIG. 8 is a perspective view of a fluid connector and a third example embodiment of an assurance cap assembly.

FIG. 8 is a perspective view of fluid connector 100 and a third example embodiment of assurance cap assembly 500.

Figure 9A:
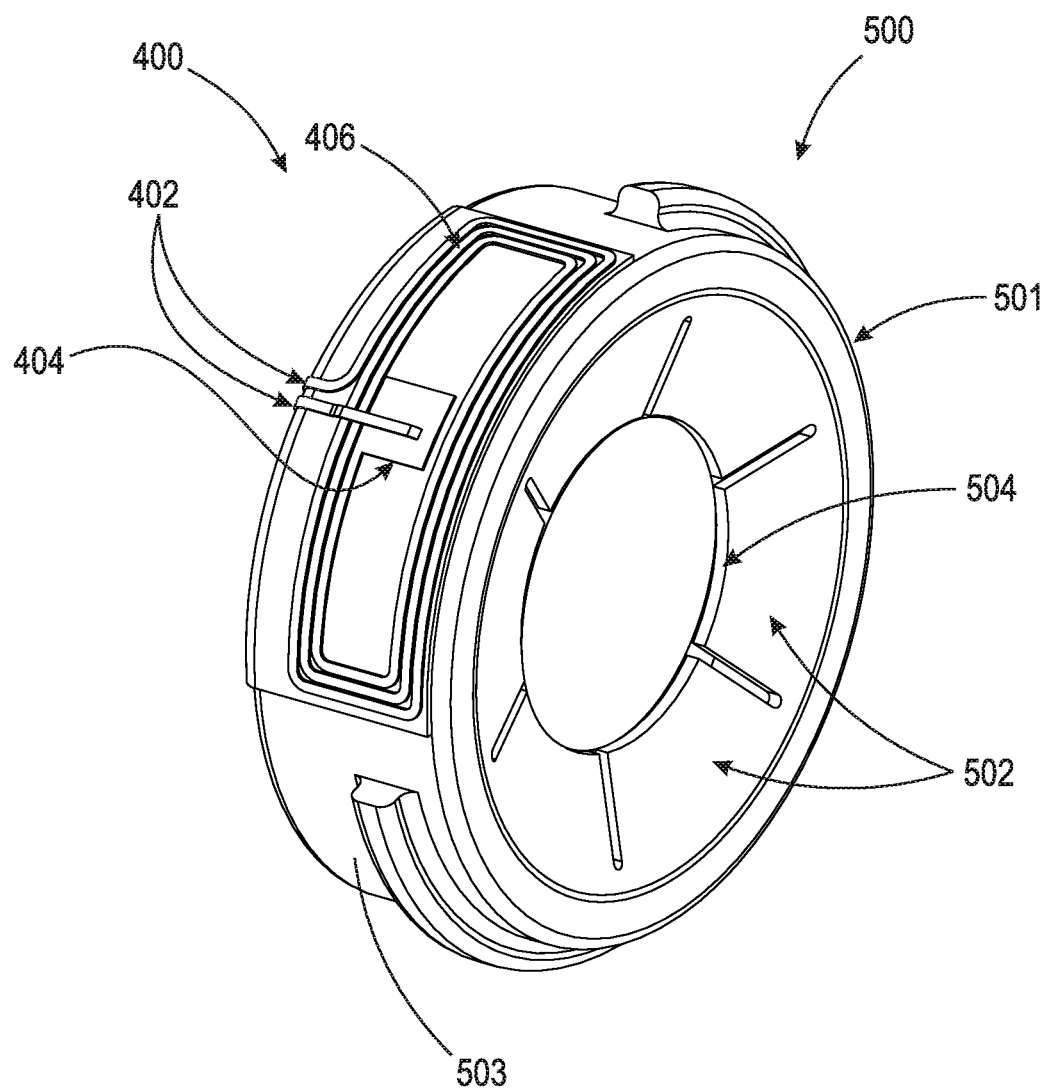
FIG. 9A is a front perspective view of the third example embodiment of the assurance cap assembly.
Figure 9B:
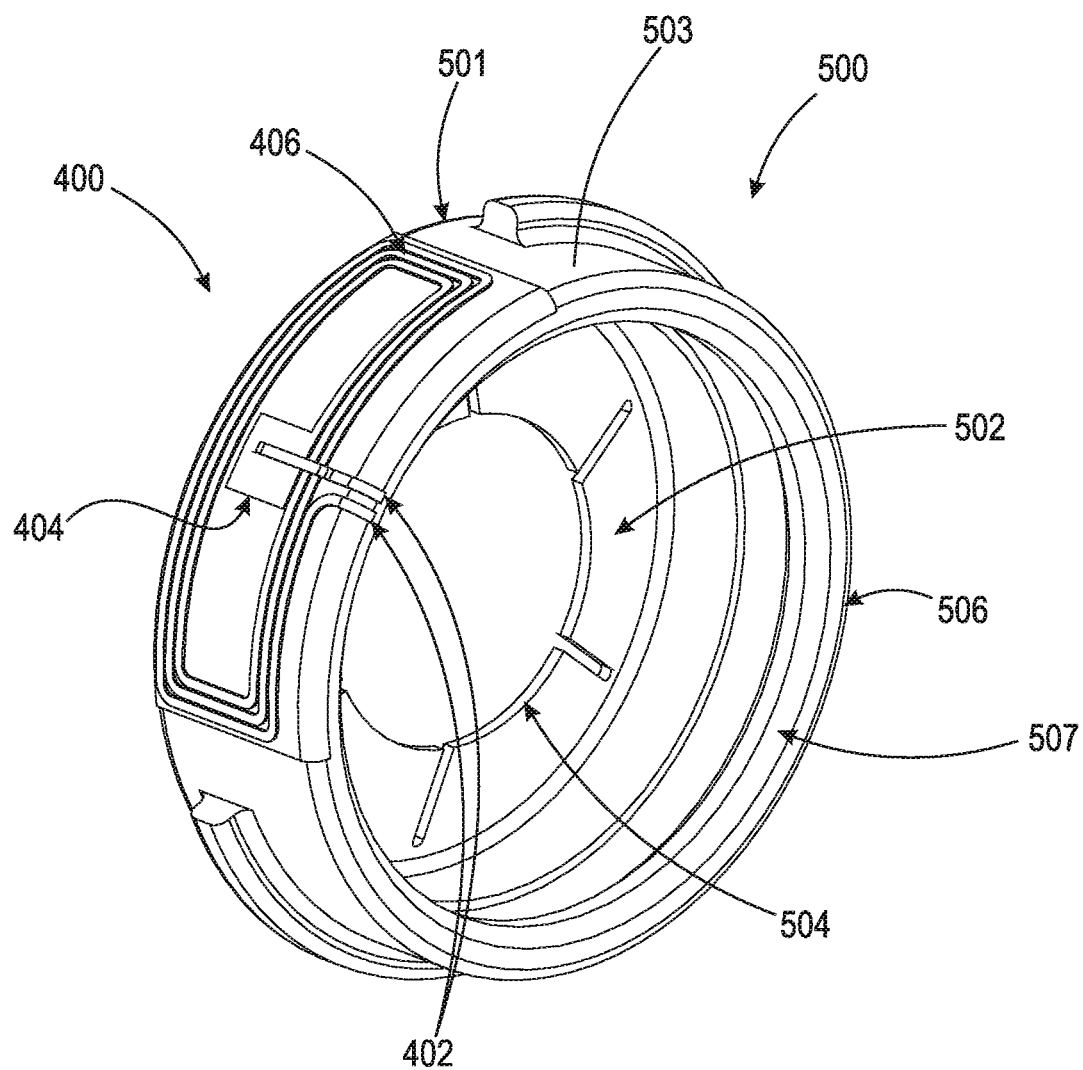
FIG. 9B is a rear perspective view of the third example embodiment of the assurance cap assembly.

FIG. 9A and FIG. 9B are a front perspective view and a rear perspective view, respectively, of the third example embodiment of assurance cap assembly 500. Assurance cap assembly 500 broadly includes body 501, tabs 502, surface 503, through-bore 504, edge 506, tab 507, and sensor circuit 400. Tabs 502 further secure tubular connector 800 and/or hose concentrically within through-bore 504. Sensor circuit 400 is operatively arranged on surface 503 of body 501. In an example embodiment, sensor circuit 400 is arranged on a substrate prior to being placed on surface 503, similar to a sticker or the like. However, it should be appreciated that sensor circuit 400 can be integral with body 501 or arranged directly on surface 503 of body 501.

Figure 10:
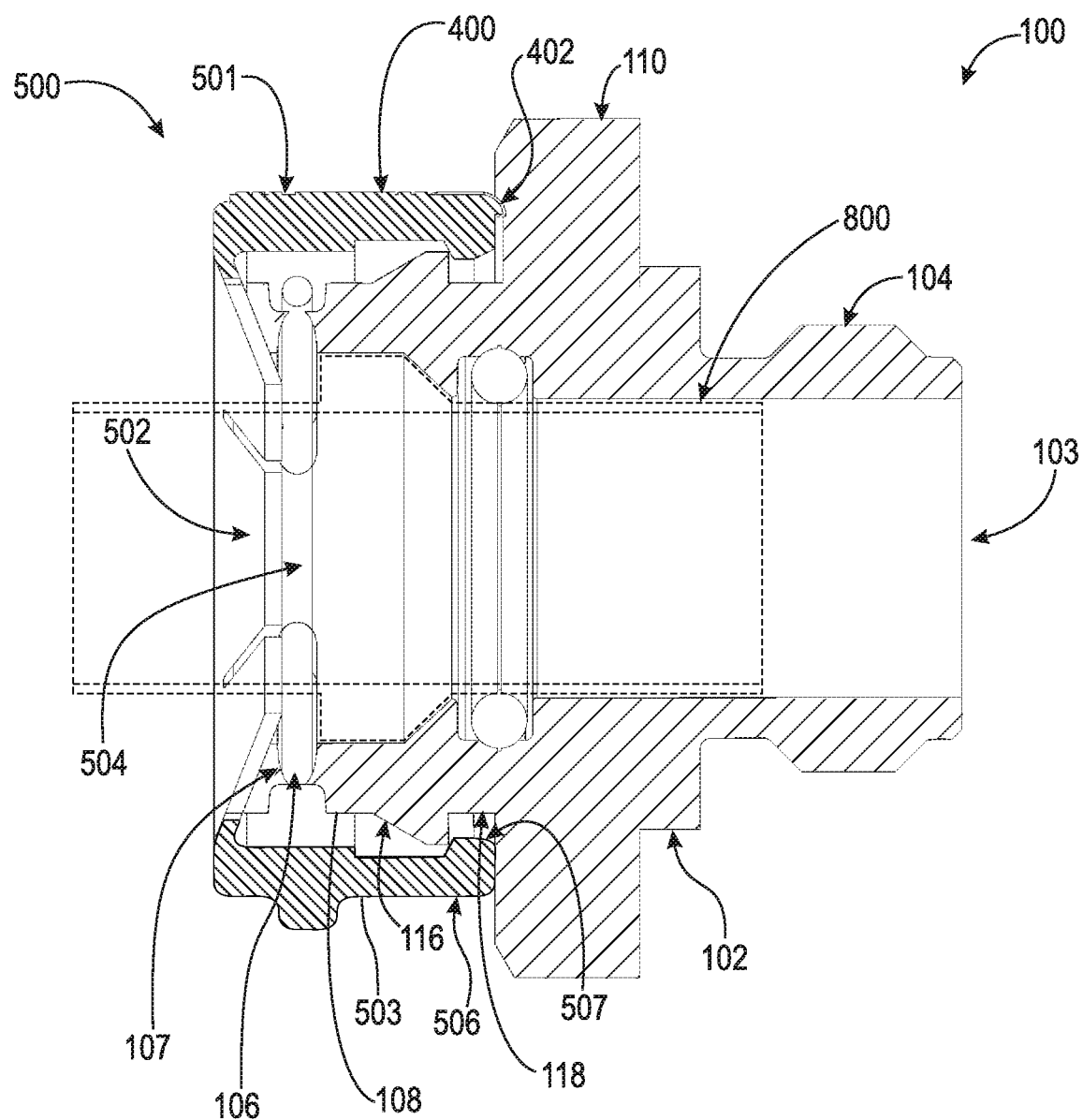
FIG. 10 is a cross-sectional view of the fluid connector and the third example embodiment of the assurance cap assembly taken generally along line 10-10 in FIG. 8.

FIG. 10 is a cross-sectional view of fluid connector 100 and the third example embodiment of assurance cap assembly 500 taken generally along line 10-10 in FIG. 8. Assurance cap assembly 500 secures to fluid connector 100 via tab 507 operatively arranged on edge 506. Tab 507 extends radially inward and secures within channel 118 of fluid connector 100. Assurance cap assembly 500 is manufactured from a material which allows tab 507 to deform enough to move past shoulder 116 of fluid connector 100 when assurance cap assembly 500 is assembled on fluid connector 100. As shown in the figure, sensor circuit 400 only activates when circuit leads 402 are in contact with fluid connector 100. In order for circuit leads 402 to reach fluid connector 100, tab 507 must be arranged within channel 118. If tab 507 is not arranged within channel 118, assurance cap assembly 500 is not properly seated on fluid connector 100. If assurance cap assembly 500 is not properly seated on fluid connector 100, then sensor circuit 400 will not be completed and will be unable to be scanned by an RFID reader by a technician during installation of assurance cap assembly 500. This lack of a reading is an indication to the technician that assurance cap assembly 500 is not properly seated on fluid connector 100 and must be reset. The completion of sensor circuit 400 due to the contact of circuit leads 402 with fluid connector 100 is due to the geometry of shoulder 116, channel 118, edge 506, tab 507, and sensor circuit 400.

Figure 11:
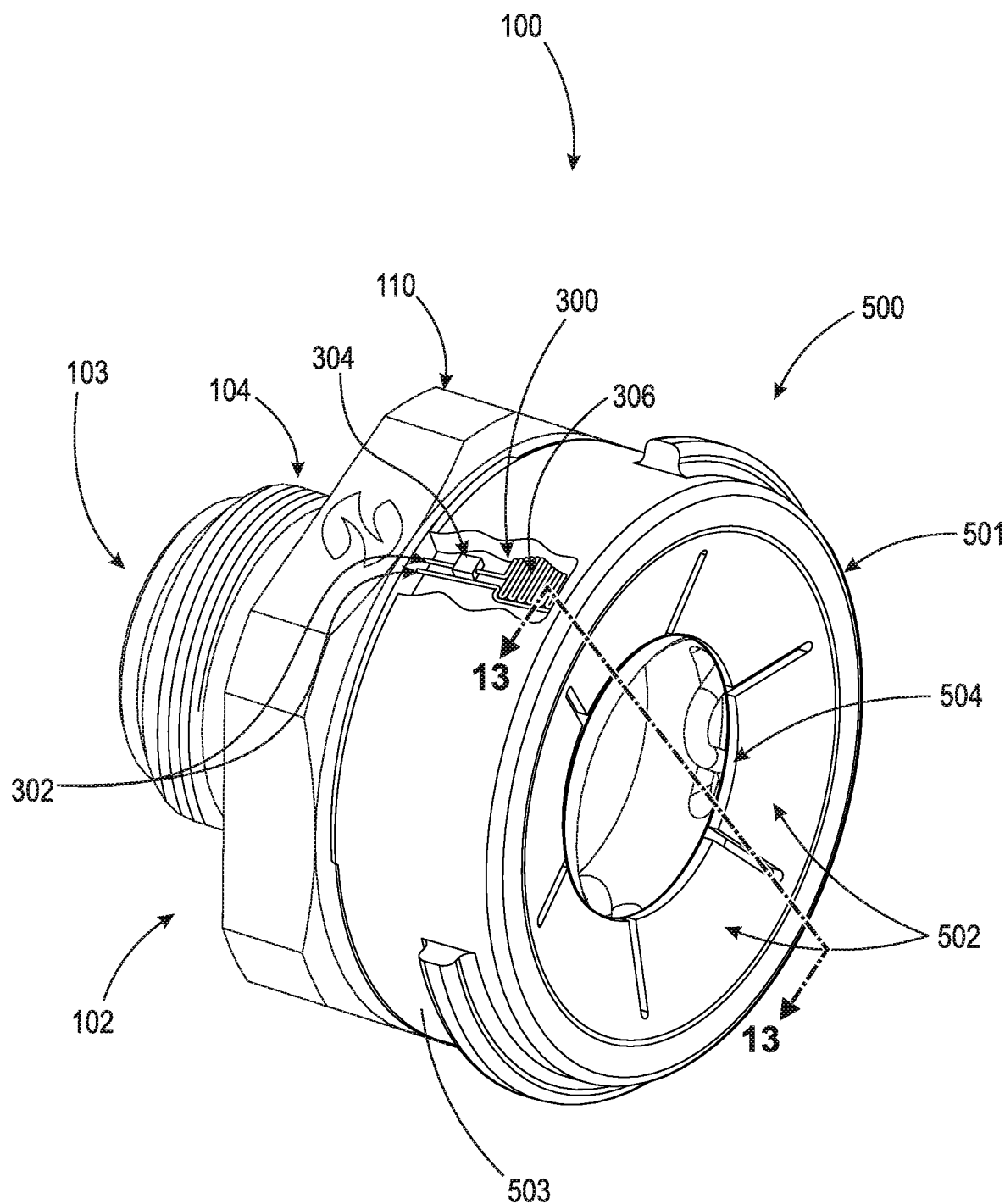
FIG. 11 is a perspective view of a fluid connector and a fourth example embodiment of the assurance cap assembly.

FIG. 11 is a perspective view of fluid connector 100 and a fourth example embodiment of assurance cap assembly 500. The fourth example embodiment of assurance cap assembly 500 is structurally substantially identical to the third example embodiment of assurance cap assembly 500 except for the sensor which is placed on the assurance cap assembly. The fourth example embodiment of assurance cap assembly 500 includes sensor circuit 300.

Figure 12A:
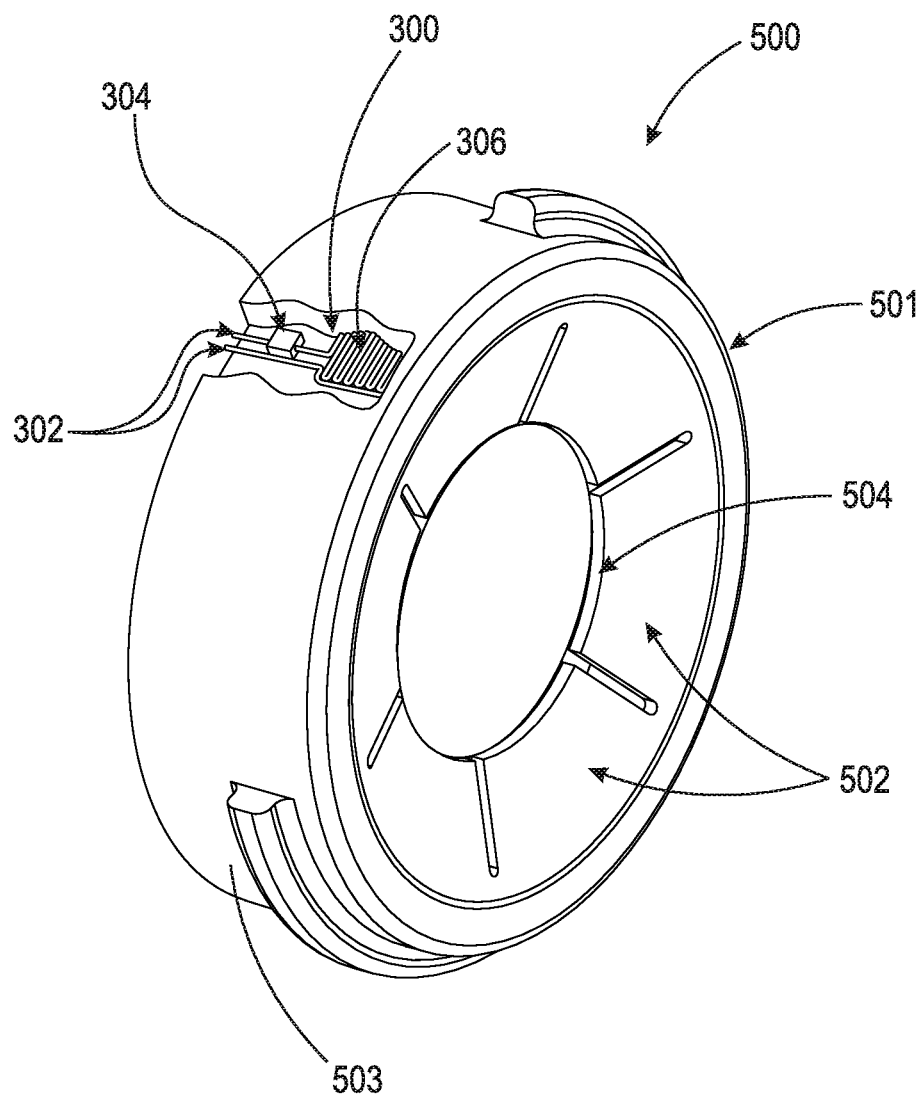
FIG. 12A is a front perspective view of the fourth example embodiment of the assurance cap assembly.
Figure 12B:
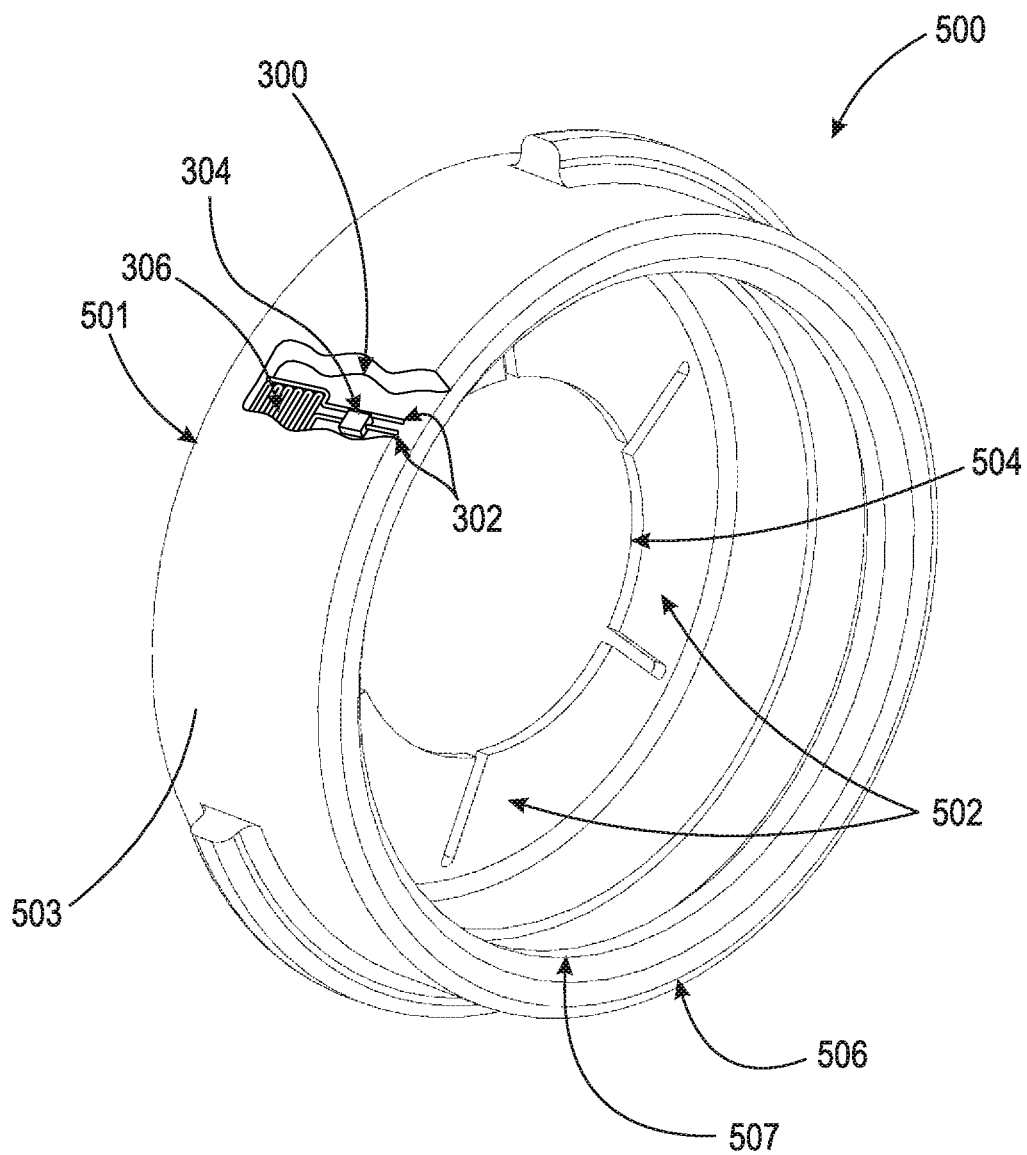
FIG. 12B is a rear perspective view of the fourth example embodiment of the assurance cap assembly.

FIG. 12A and FIG. 12B are a front perspective view and a rear perspective view, respectively, of the fourth example embodiment of assurance cap assembly 500. Surface 503 is show as a cutaway in order to improve clarity of sensor circuit 300. Sensor circuit 300 comprises circuit leads 302, RFID chip 304, and antenna 306. Circuit leads 302 axial extend and protrude from edge 506 of body 501. Additionally, circuit leads 302 are operatively arranged to not engage one another in such a way which would complete sensor circuit 300 and allow electricity to flow through sensor circuit 300.

Figure 13:
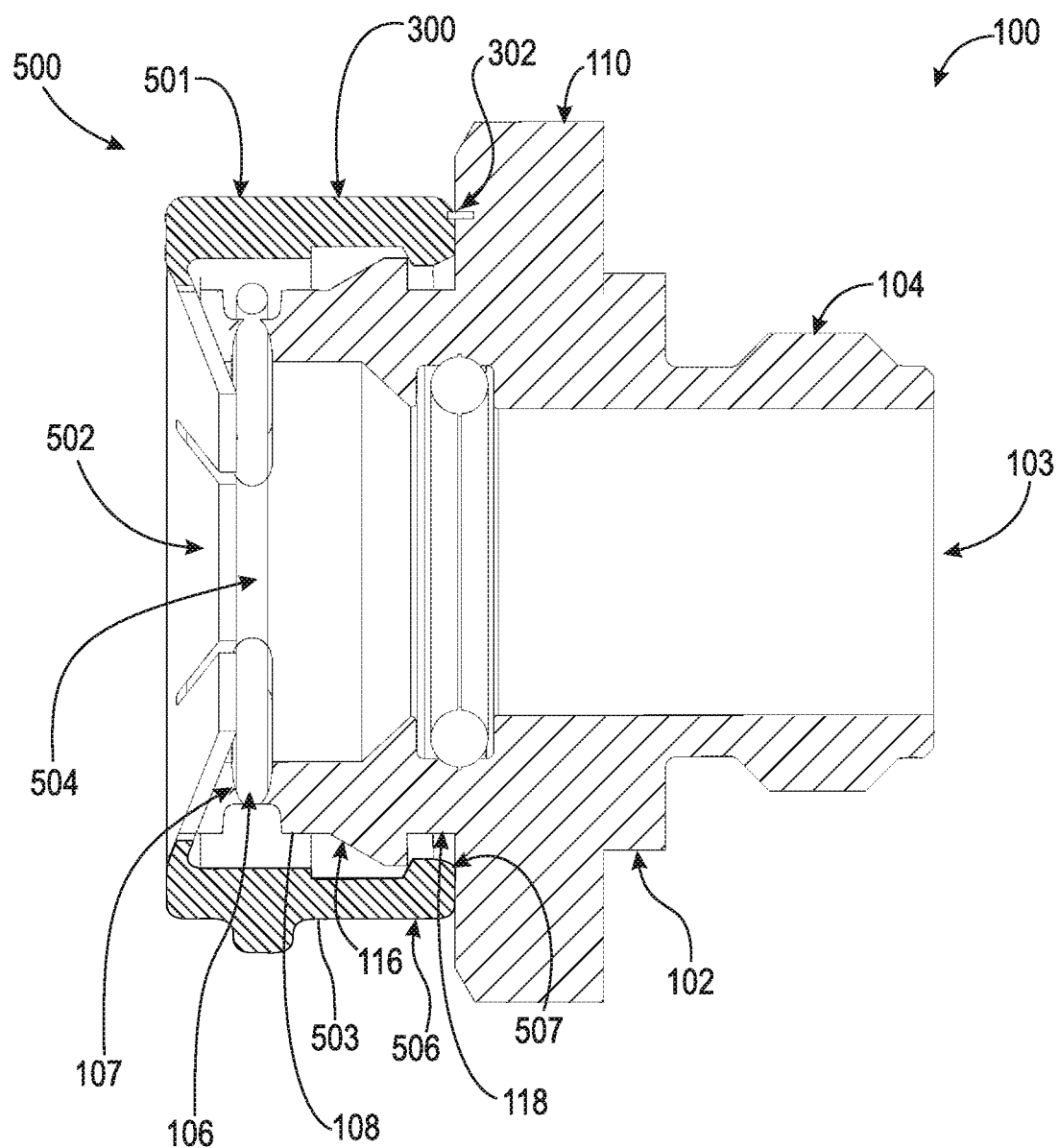
FIG. 13 is a cross-sectional view of the fluid connector and the fourth example embodiment of the assurance cap assembly taken generally along line 13-13 in FIG. 11.

FIG. 13 is a cross-sectional view of fluid connector 100 and the fourth example embodiment of assurance cap assembly 500 taken generally along line 13-13 in FIG. 11. As shown in the figure, sensor circuit 300 only activates when circuit leads 302 are in contact with fluid connector 100. The electrical conducting section only needs to be arranged on fluid connector 100 in such a way as to allow circuit leads 302 to complete sensor circuit 300. In order for circuit leads 302 to reach fluid connector 100, tab 507 must be arranged within channel 118. If tabs 507 are not arranged within channel 118, assurance cap assembly 500 is not properly seated on fluid connector 100. If assurance cap assembly 500 is not properly seated on fluid connector 100, then sensor circuit 300 will not be completed and RFID chip 304 will be unable to be scanned by an RFID reader by a technician during installation of assurance cap assembly 500. This lack of a reading is an indication to the technician that assurance cap assembly 500 is not properly seated on fluid connector 100 and must be reset. The completion of sensor circuit 400 due to the contact of circuit leads 302 with fluid connector 100 is due to the geometry of shoulder 116, channel 118, edge 506, tab 507, and sensor circuit 300.

Figure 14:
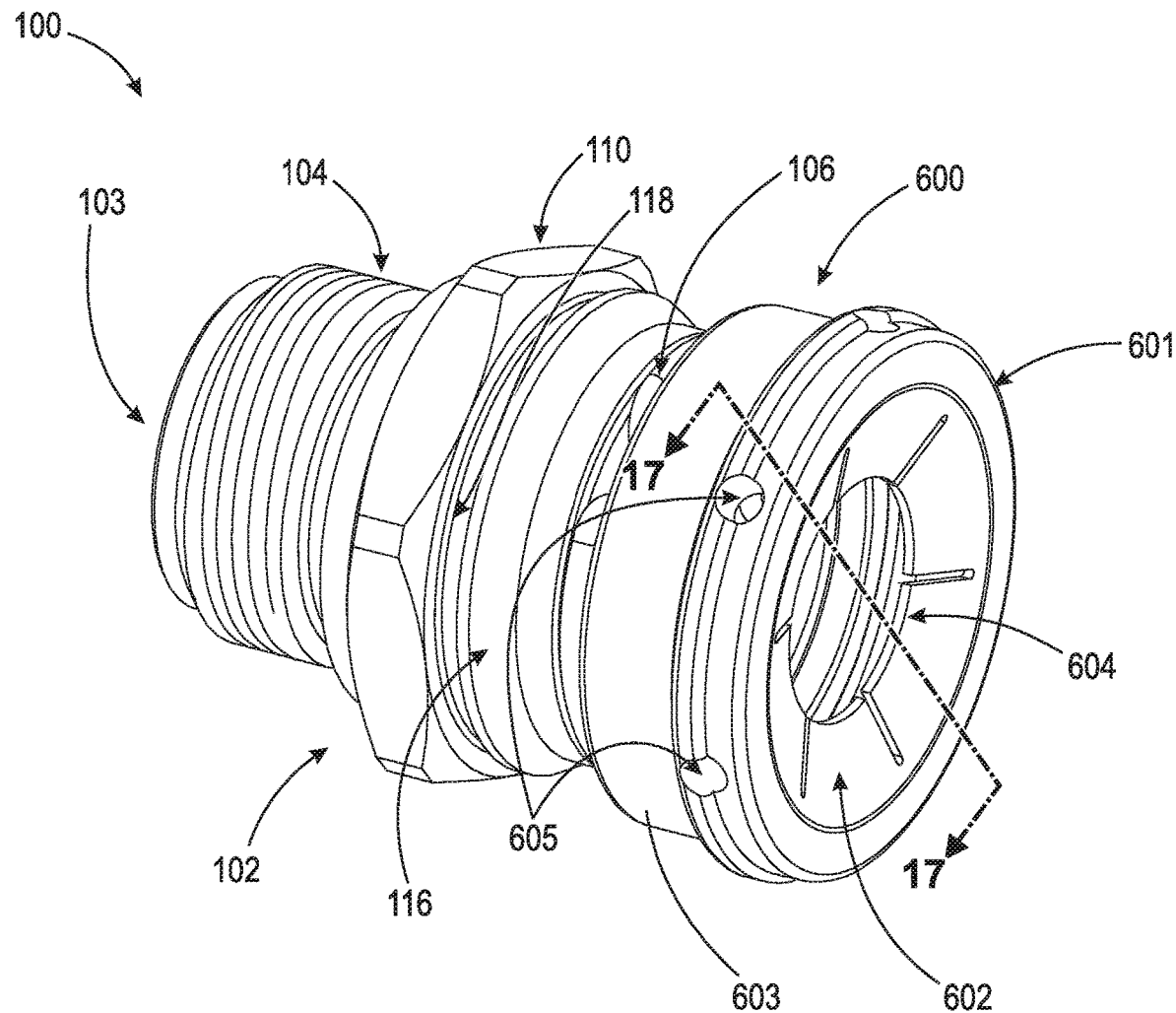
FIG. 14 is a perspective view of a fluid connector and a fifth example embodiment of an assurance cap assembly.

FIG. 14 is a perspective view of fluid connector 100 and a fifth example embodiment of assurance cap assembly 600. The fifth example embodiment of assurance cap assembly 600 is structurally substantially identical to the third example embodiment of assurance cap assembly 500 except for addition of apertures 605 and the sensor which is corresponding to the assurance cap assembly. The fifth example embodiment of assurance cap assembly 600 includes sensor ring 700 operatively arranged in through-bore 604 of assurance cap assembly 600.

Figure 15A:
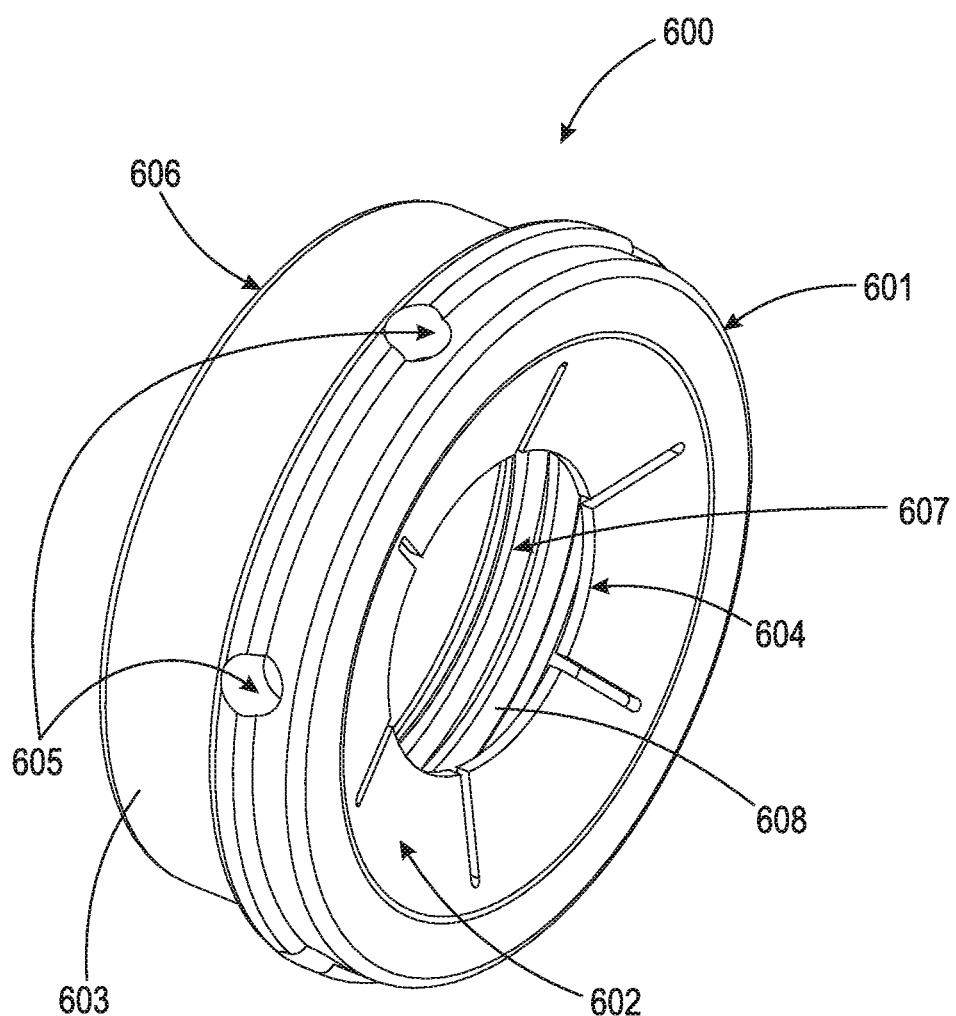
FIG. 15A is a front perspective view of the fifth example embodiment of the assurance cap assembly.
Figure 15B:
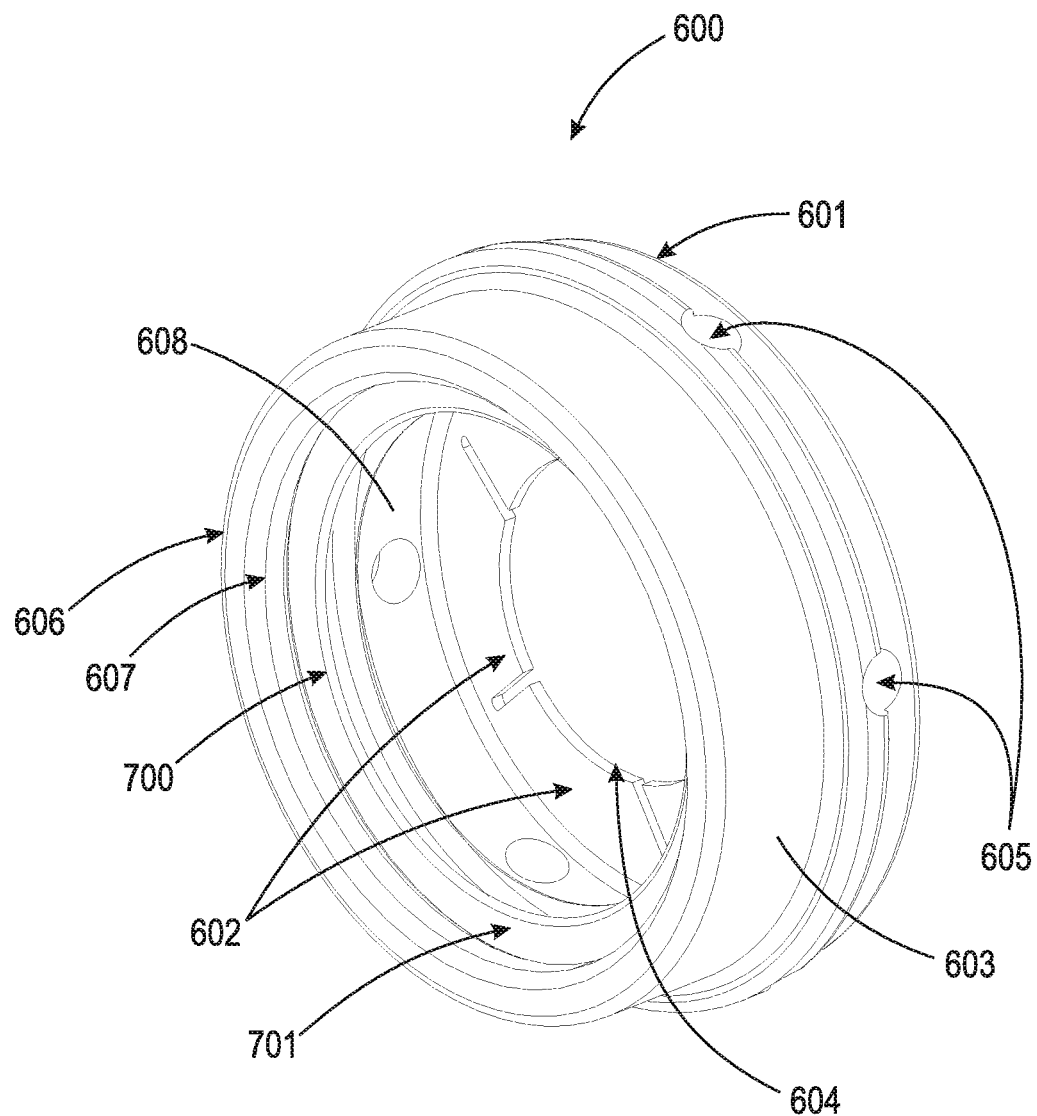
FIG. 15B is a rear perspective view of the fifth example embodiment of the assurance cap assembly.

FIG. 15A and FIG. 15B are a front perspective view and a rear perspective view, respectively, of the fifth example embodiment of assurance cap assembly 600. Assurance cap assembly 600 broadly includes body 601, tabs 602, surface 603, through-bore 604, apertures 605, edge 606, tab 607, and sensor ring 700. Tabs 602 further secure tubular connector 800 and/or a hose concentrically within through-bore 604. Sensor ring 700 is slidably arranged on surface 608 of body 601. Tab 607 extends radially inward from edge 606 and secures within channel 118 of fluid connector 110 (shown in FIG. 17B) when assurance cap assembly 600 is properly seated on fluid connector 100.

Figure 16:
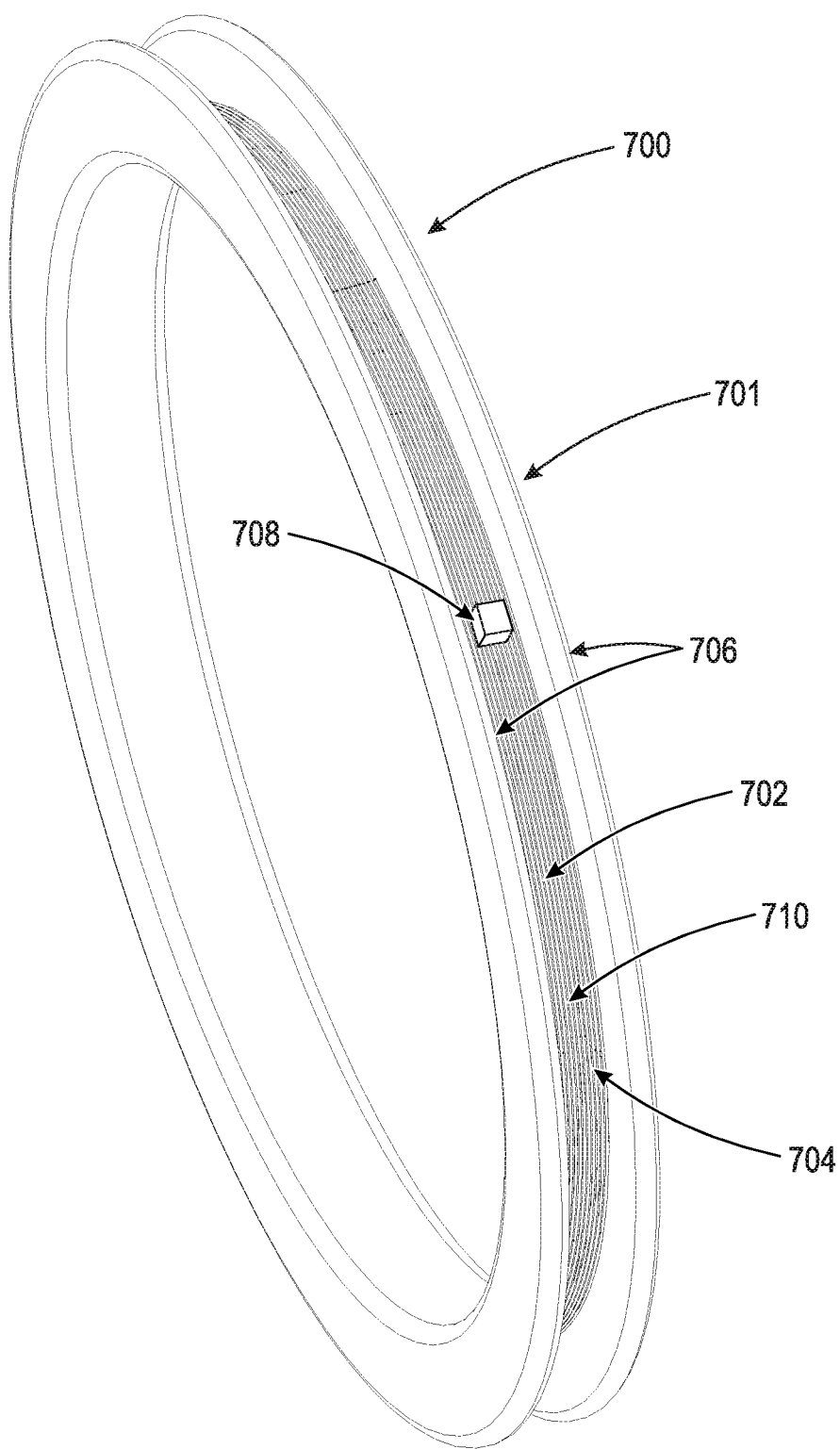
FIG. 16 is a perspective view of a sensor ring.

FIG. 16 is a perspective view of sensor ring 700. Sensor ring 700 broadly includes body 701, sensor circuit 702, channel 704, and shoulders 706. Sensor circuit 702 includes RFID chip 708 and antenna 710. Unlike the previous assurance cap example embodiments, sensor circuit 702 is a completed and connected RFID circuit which allows for scanning of sensor circuit 702 with an RFID scanner.

Figure 17A:
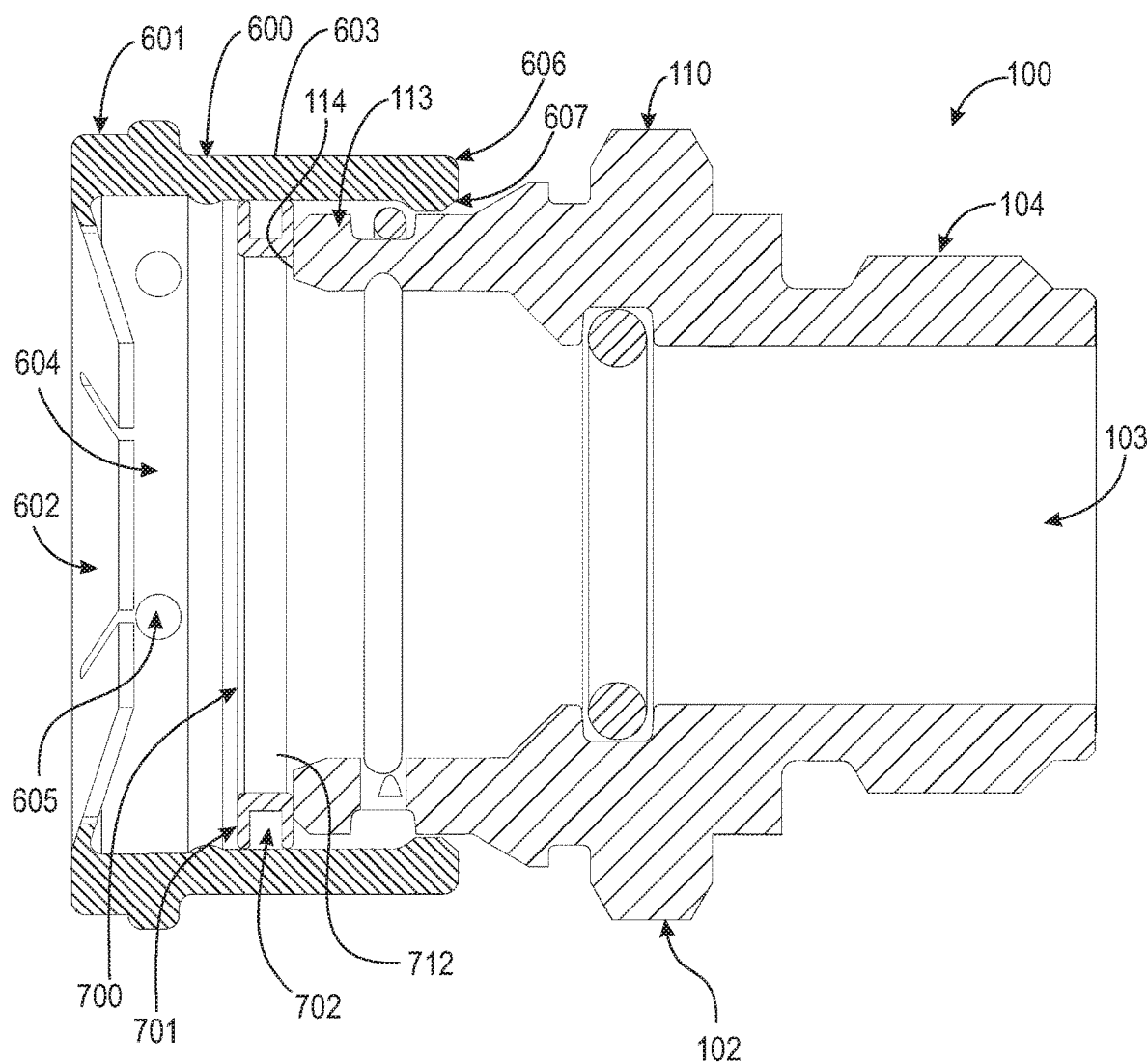
FIG. 17A is a cross-sectional view of the fluid connector and the fifth example embodiment of the assurance cap assembly not fully seated on the fluid connector taken generally along line 17-17 in FIG. 14; and, FIG. 17B is a cross-sectional view of the fluid connector and the fifth example embodiment of the assurance cap assembly fully seated on the fluid connector taken generally along line 17-17 in FIG. 14.

FIG. 17A is a cross-sectional view of fluid connector 100 and the fifth example embodiment of assurance cap assembly 600 not fully seated on fluid connector 100 taken generally along line 17-17 in FIG. 14. When body 601 is not fully seated on fluid connector 100, sensor ring 700 is axially displaced from apertures 605. In an example embodiment, fluid connector 100 is manufactured from a metallic material which prevents the transfer of electromagnetic waves through its body. However, it should be appreciated that any material which sufficiently blocks electromagnetic waves can be used to manufacture fluid connector 100. Due to this electromagnetic signal blockage by fluid connector 100, sensor circuit 702 of sensor ring 700 cannot be scanned by a technician, giving the technician notice that assurance cap assembly 600 is not fully seated on fluid connector 100 and must be reseated.

Figure 17B:
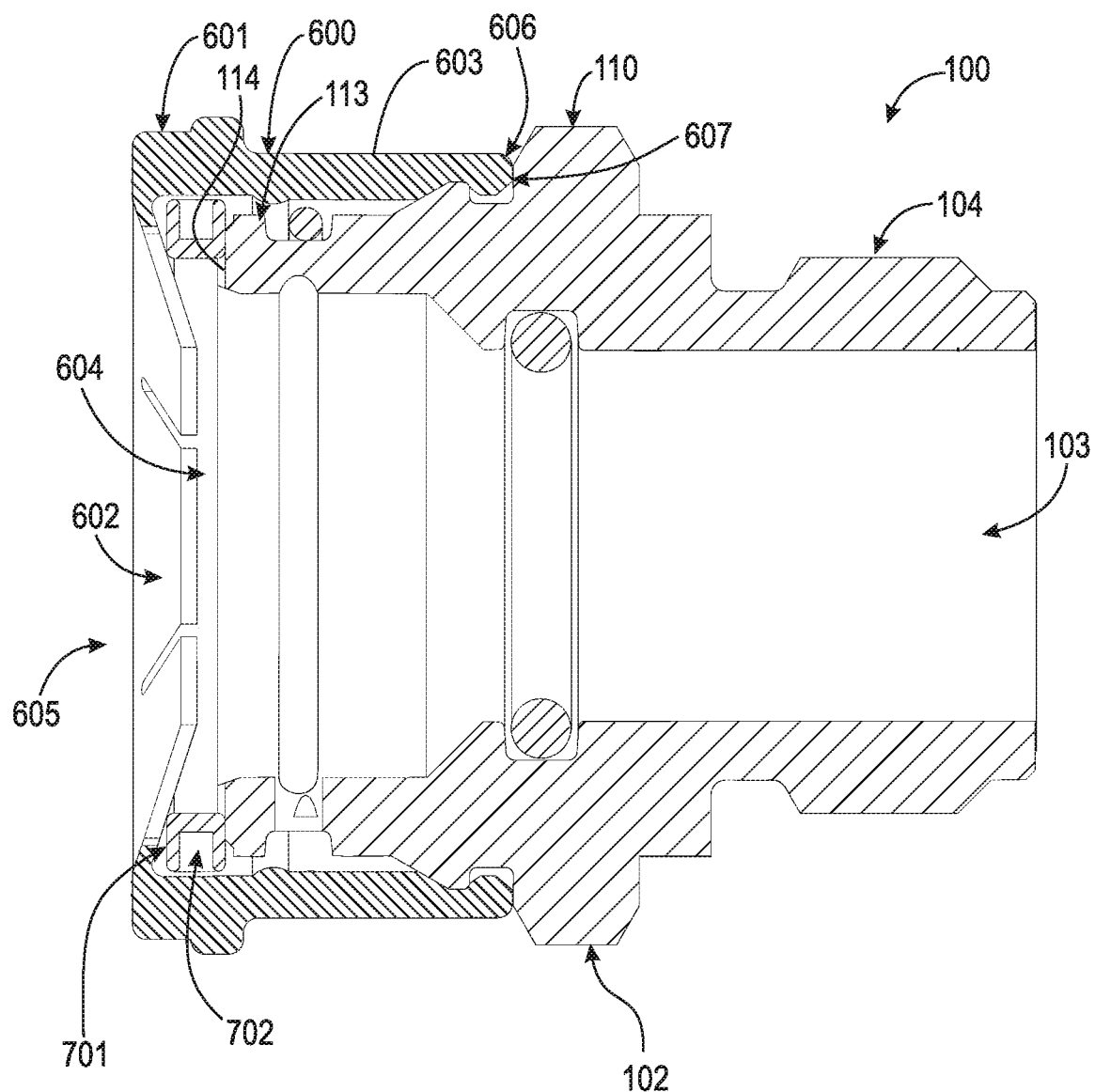

FIG. 17B is a cross-sectional view of fluid connector 100 and the fifth example embodiment of assurance cap assembly 600 fully seated on fluid connector 100 taken generally along line 17-17 in FIG. 14. Once assurance cap assembly is placed on fluid connector 100, a technician then axially slides assurance cap assembly 600 towards fluid connector 100. This sliding motion causes on of shoulders 706 of sensor ring 700 to abut against surface 114 of shoulder 113 of fluid connector 100. This interaction between shoulder 113 and shoulder 706 causes sensor ring 700 to axially remain in place as body 601 is axially displaced towards fluid connector 100. In a final assembled state, sensor ring 700 is axially aligned with apertures 605 to allow sensor circuit to interact with an RFID scanner. Apertures 605 allow for electromagnetic waves to reach sensor circuit 702 once sensor ring is in the correct axial position. Once sensor ring 700 is in the correct axial position and sensor ring 702 can be scanned, this indicates to a technician that assurance cap assembly 600 is fully seated on fluid connector 100.

In the foregoing description, example embodiments are described. The specification and drawings are accordingly to be regarded in an illustrative rather than a restrictive sense.

It will be appreciated that various aspects of the above-disclosed disclosure and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

100 Fluid connector
101 Section
102 Section
103 Through-bore
104 Threads
106 Snap ring
107 Aperture
108 Outer surface
110 Head
112 Inner surface
113 Shoulder
114 Surface
116 Shoulder
118 Surface
200 Assurance cap assembly
201 Body
202 Channel
204 Through-bore
205 Lips
206 Arms
207 Tabs
210 Sensor arm
211 Surface
220 Sensor arm
221 Surface
300 Sensor circuit
302 Circuit leads
304 Radio frequency identification (RFID) chip
306 Antenna
400 Sensor circuit
402 Circuit leads
404 Radio frequency identification (RFID) chip
406 Antenna
500 Assurance cap assembly
501 Body
502 Tabs
503 Surface
504 Through-bore 506 Edge
507 Tab
600 Assurance cap assembly
601 Body
602 Tabs
603 Surface
604 Through-bore
605 Apertures
606 Edge
607 Tab
608 Surface
700 Sensor ring
701 Body
702 Sensor circuit
702A Radio frequency identification (RFID) chip
702B Antenna
704 Channel
706 Shoulders
708 surface Radio frequency identification (RFID) chip
710 Antenna
712 Surface
800 Tubular connector

What is claimed is:

1. A radio frequency identification (RFID) smart inspection assurance cap operatively arranged to communicate whether a tubular connector is fully seated in a fluid connector, comprising:
a body comprising:
a through-bore;
radially outward facing surface; and,
an inner surface; and,
a RFID circuit comprising:
a RFID chip;
a first circuit lead connected to said RFID chip; and,
a second circuit lead connected to said RFID chip, said first circuit lead and said second circuit lead electrically disconnected from one another, deactivating said RFID chip;
wherein:
said RFID smart inspection assurance cap is operatively arranged to connect to said fluid connector;
said first circuit lead is arranged to contact said fluid connector;
said second circuit lead is arranged to contact said fluid connector; and,
said RFID circuit is completed when said first circuit lead and said second circuit lead simultaneously contact said fluid connector.

2. The RFID smart inspection assurance cap as recited in claim 1, wherein said RFID circuit is embedded within said body of said assurance cap.

3. The RFID smart inspection assurance cap as recited in claim 1, wherein said RFID circuit is arranged on said radially outward facing surface of said body of said assurance cap.

4. The RFID smart inspection assurance cap as recited in claim 1, wherein said fluid connector comprises an electrical conducting section to complete said RFID circuit.

5. The RFID smart inspection assurance cap as recited in claim 1, wherein said fluid connector is made of an electrical conducting material.

6. The RFID smart inspection assurance cap as recited in claim 1, wherein said RFID smart inspection assurance cap is fully seated on said fluid connector when said first circuit lead and said second circuit lead contact said fluid connector.

7. The RFID smart inspection assurance cap as recited in claim 1, wherein said RFID chip activates when said RFID smart inspection assurance cap is fully seated on said fluid connector.

8. A fluid connector assembly, comprising:
a fluid connector comprising a first through-bore;
a tubular connector arranged in said first through-bore; and,
a radio frequency identification (RFID) smart inspection assurance cap operatively arranged to connect to said fluid connector and communicate whether the tubular connector is fully seated in the fluid connector, the RFID smart inspection assurance cap, comprising:
a body comprising:
a second through-bore;
a radially outward facing surface; and,
an inner surface; and,
a RFID circuit comprising:
a RFID chip;
a first circuit lead connected to said RFID chip; and,
a second circuit lead connected to said RFID chip, said first circuit lead and said second circuit lead electrically disconnected from one another, deactivating said RFID chip;
wherein:
said RFID smart inspection assurance cap is operatively arranged on said tubular connector;
said first circuit lead is arranged to contact said fluid connector;
said second circuit lead is arranged to contact said fluid connector; and,
said RFID circuit is completed when said first circuit lead and said second circuit lead simultaneously contact said fluid connector.

9. The RFID smart inspection assurance cap as recited in claim 8, wherein said RFID circuit is embedded within said body of said assurance cap.

10. The RFID smart inspection assurance cap as recited in claim 8, wherein said RFID circuit is arranged on said outer radially outward facing surface of said body of said assurance cap.

11. The RFID smart inspection assurance cap as recited in claim 8, wherein said fluid connector comprises an electrical conducting section to complete said RFID circuit.

12. The RFID smart inspection assurance cap as recited in claim 8, wherein said fluid connector is made of an electrical conducting material.

13. The RFID smart inspection assurance cap as recited in claim 8, wherein said RFID smart inspection assurance cap is fully seated on said fluid connector when said first circuit lead and said second circuit lead contact said fluid connector.

14. A radio frequency identification (RFID) smart inspection assurance cap, comprising:
a body comprising:
a through-bore axially arranged within said body;
an inner surface formed by said through-bore; and,
an aperture arranged within said body, the aperture extending radially outward from the through-bore to a radially outward facing surface of said body; and,
a sensor ring slidably arranged within said through-bore and in contact with said inner surface.

15. The RFID smart inspection assurance cap as recited in claim 14, wherein said sensor ring comprises a RFID chip.

16. The RFID smart inspection assurance cap as recited in claim 15, wherein in a first state, said RFID chip is prevented from communication by said body.

17. The RFID smart inspection assurance cap as recited in claim 16, wherein in a second state, said sensor ring is operatively arranged to allow communication of said RFID chip via said aperture.

18. The RFID smart inspection assurance cap as recited in claim 17, wherein said RFID smart inspection assurance cap is fully seated on said fluid connector when said sensor ring is in said second state.

19. The RFID smart inspection assurance cap as recited in claim 15, further comprising a tubular connector arranged within said through-bore.

20. The RFID smart inspection assurance cap as recited in claim 14, wherein said RFID smart inspection assurance cap is operatively arranged to connect to a fluid connector.

\* \* \* \* \*